(12) United States Patent
Kishigami et al.

(10) Patent No.: US 8,654,710 B2
(45) Date of Patent: Feb. 18, 2014

(54) BASE STATION DEVICE AND TERMINAL DEVICE

(75) Inventors: Takaaki Kishigami, Tokyo (JP); Isamu Yoshii, Kanagawa (JP); Ryohei Kimura, Tokyo (JP); Seigo Nakao, Kanagawa (JP)

(73) Assignee: Panasonic Corporation, Osaka (JP)

( * ) Notice: Subject to any disclaimer, the term of this patent is extended or adjusted under 35 U.S.C. 154(b) by 217 days.

(21) Appl. No.: 13/058,313

(22) PCT Filed: Aug. 12, 2009

(86) PCT No.: PCT/JP2009/003882
§ 371 (c)(1),
(2), (4) Date: Feb. 9, 2011

(87) PCT Pub. No.: WO2010/018690
PCT Pub. Date: Feb. 18, 2010

(65) Prior Publication Data
US 2011/0134850 A1    Jun. 9, 2011

(30) Foreign Application Priority Data
Aug. 12, 2008  (JP) .................. 2008-208047

(51) Int. Cl.
*H04W 4/00* (2009.01)
(52) U.S. Cl.
USPC ....................... 370/328; 455/422.1
(58) Field of Classification Search
None
See application file for complete search history.

(56) References Cited

U.S. PATENT DOCUMENTS

| | | | |
|---|---|---|---|
| 5,283,817 A * | 2/1994 | Hara et al. | 455/463 |
| 8,363,633 B2 * | 1/2013 | Ko et al. | 370/343 |
| 2004/0235472 A1 * | 11/2004 | Fujishima et al. | 455/434 |
| 2005/0135416 A1 * | 6/2005 | Ketchum et al. | 370/469 |
| 2005/0174981 A1 * | 8/2005 | Heath et al. | 370/342 |
| 2005/0250506 A1 | 11/2005 | Beale et al. | |
| 2007/0086541 A1 * | 4/2007 | Moon et al. | 375/267 |
| 2007/0293172 A1 * | 12/2007 | Shi et al. | 455/187.1 |
| 2008/0008110 A1 * | 1/2008 | Kishigami et al. | 370/310 |
| 2008/0212550 A1 * | 9/2008 | Han et al. | 370/342 |
| 2008/0212701 A1 * | 9/2008 | Pan et al. | 375/260 |
| 2009/0016263 A1 | 1/2009 | Kishigami et al. | |
| 2009/0016460 A1 | 1/2009 | Hwang et al. | |

(Continued)

FOREIGN PATENT DOCUMENTS

| | | |
|---|---|---|
| EP | 2 051 426 | 4/2009 |
| JP | 2006-005908 | 1/2006 |

(Continued)

OTHER PUBLICATIONS

International Search Report dated Oct. 20, 2009.

(Continued)

*Primary Examiner* — Bunjob Jaroenchonwanit
(74) *Attorney, Agent, or Firm* — Dickinson Wright PLLC

(57) ABSTRACT

A base station (100) reduces overhead created by the notification of user allocation information (individual control information) in performing multi-user MIMO transmission. The base station (100) has spatial multiplex signal forming units (individual data sequence creation unit (120) and beam formation unit (123)) that form signals that are spatial multiplex transmitted from multiple antennas, a common control signal formation unit (111) that forms common control signals that are transmitted in common from multiple antennas, and an individual control signal appending unit (122) that includes an individual control signal for each terminal address in a spatial multiplex transmitted signal.

20 Claims, 22 Drawing Sheets

(56) References Cited

U.S. PATENT DOCUMENTS

| | | | |
|---|---|---|---|
| 2009/0109905 A1* | 4/2009 | Ahmadi | 370/329 |
| 2009/0279486 A1 | 11/2009 | Kishigami et al. | |
| 2010/0111226 A1* | 5/2010 | Ko et al. | 375/299 |
| 2012/0051457 A1* | 3/2012 | Ma et al. | 375/295 |
| 2012/0221769 A1* | 8/2012 | Ware et al. | 711/103 |
| 2012/0230233 A1* | 9/2012 | Jia et al. | 370/280 |

FOREIGN PATENT DOCUMENTS

| | | |
|---|---|---|
| JP | 2006-238423 | 9/2006 |
| JP | 2006-319959 | 11/2006 |
| JP | 2007-074318 | 3/2007 |
| JP | 2007-536846 | 12/2007 |
| JP | 2008-301494 | 12/2008 |
| WO | 2008/018468 | 2/2008 |

OTHER PUBLICATIONS

A. Morimoto, et al., "Transmit Diversity Schemes Suitable for Common Control Channel in Evolved UTRA Downlink," IEICE Technical Report, vol. 107, No. 147, RCS2007-50, Jul. 2007, pp. 125-130 and 2 bibliographic pages.

3GPP TSG RAN WG1 Meeting #49bis, "MIMO AH Summary," AH Chairman, R1-073225, Jun. 2007, pp. 1-5.

T. Ohgane, et al., "A Study on a Channel Allocation Scheme with an Adaptive Array in SDMA," IEEE 47th VTC, vol. 2, May 1997, pp. 725-729.

G. J. Foschini, "Layered Space-Time Architecture for Wireless Communication in a Fading Environment When Using Multi-Element Antennas," Bell Labs Technical Journal, Autumn 1996, pp. 41-59.

3GPP TS 36.211 V8.3.0, "Evolved Universal Terrestrial Radio Access (E-UTRA); Physical Channels and Modulation (Release 8)," May 2008, pp. 1-77.

Part 1 of 2: IEEEE Std 802.16e-2005, "IEEE Standard for Local and metropolitan area networks—Part 16: Air Interface for Fixed and Mobile Broadband Wireless Access Systems," Feb. 2006, pp, Cover Page, i-xxvii, xxix-xI, 1-516.

Part 2 of 2: IEEE Std 802.16e-2005, "IEEE Standard for Local and metropolitan area networks—Part 16: Air Interface for Fixed and Mobile Broadband Wireless Access Systems," Feb. 2006, pp. 517-822.

3GPP TSG RAN WG1 #49, "DL control signaling of MIMO PMI information for SU-MIMO," Huawei, R1-072318, Kobe, Japan, May 7-11, 2007, pp. 1-5.

* cited by examiner

- BURST INFORMATION
- MIMO MODE INFORMATION
- NUMBER OF SPATIAL MULTIPLEXING INFORMATION
- CID1, MCS1, PVI1
- CID2, MCS2, PVI2
- CID3, MCS3, PVI3
- CID4, MCS4, PVI4
  : : :

FIG.2

Table 330—MIMO DL Basic IE format

| Syntax | Size (bit) | Notes |
|---|---|---|
| MIMO_DL_Basic_IE() { | — | — |
| Extended DIUC | 4 | MIMO = 0x0B |
| Length | 8 | Variable |
| Num_Region | 4 | "Number of assigned regions" is this field value plus 1. |
| for ( i = 0; I < Number of assigned regions; i++) { | — | — |
| OFDMA Symbol offset | 8 | — |
| If (Permutation = 0b11 and (AMC type is 2x3 or 1x6)) { | — | — |
| Subchannel offset | 8 | — |
| Boosting | 3 | — |
| No. OFDMA Symbols | 5 | — |
| No. subchannels | 6 | — |
| Else { | — | — |
| Subchannel offset | 6 | — |
| Boosting | 3 | — |
| No. OFDMA Symbols | 7 | — |
| No. subchannels | 6 | — |
| } | — | — |
| Matrix_indicator | 2 | STC matrix (see 8.4.8.1.4) if (STC == 0b01 or STC == 0b10) { 0b00 = Matrix A 0b01 = Matrix B 0b10 = Matrix C 0b11 = Reserved } else if (STC == 0b11) { 0b00 = Matrix A 0b01 = Matrix B 0b10–11 = Reserved } |

FIG.3A

| Syntax | Size (bit) | Notes |
|---|---|---|
| Num_Spatial Multiplexing | 2 | 0b00=1Spatial Multiplexing ; 0b01=2Spatial Multiplexing ; 0b10=3Spatial Multiplexing ; 0b11=4Spatial Multiplexing |
| Reserved | 2 | Shall be set to zero |
| for (j =0; j <Number of Spatial Multiplexing; j++) { | — | — |
| if (INC_CID =1){ | — | — |
| CID | 16 | — |
| } | — | — |
| Spatial Multiplexing Index | 2 | — |
| DIUC | 4 | — |
| Repetition coding indication | 2 | 0b00: No repetition coding<br>0b01: Repetition coding of 2 used<br>0b10: Repetition coding of 4 used<br>0b11: Repetition coding of 6 used |
| } | — | — |
| } | — | — |
| Padding | variable | Number of bits required to align to byte length: shall be set to zero |
| } | — | — |

FIG. 3B

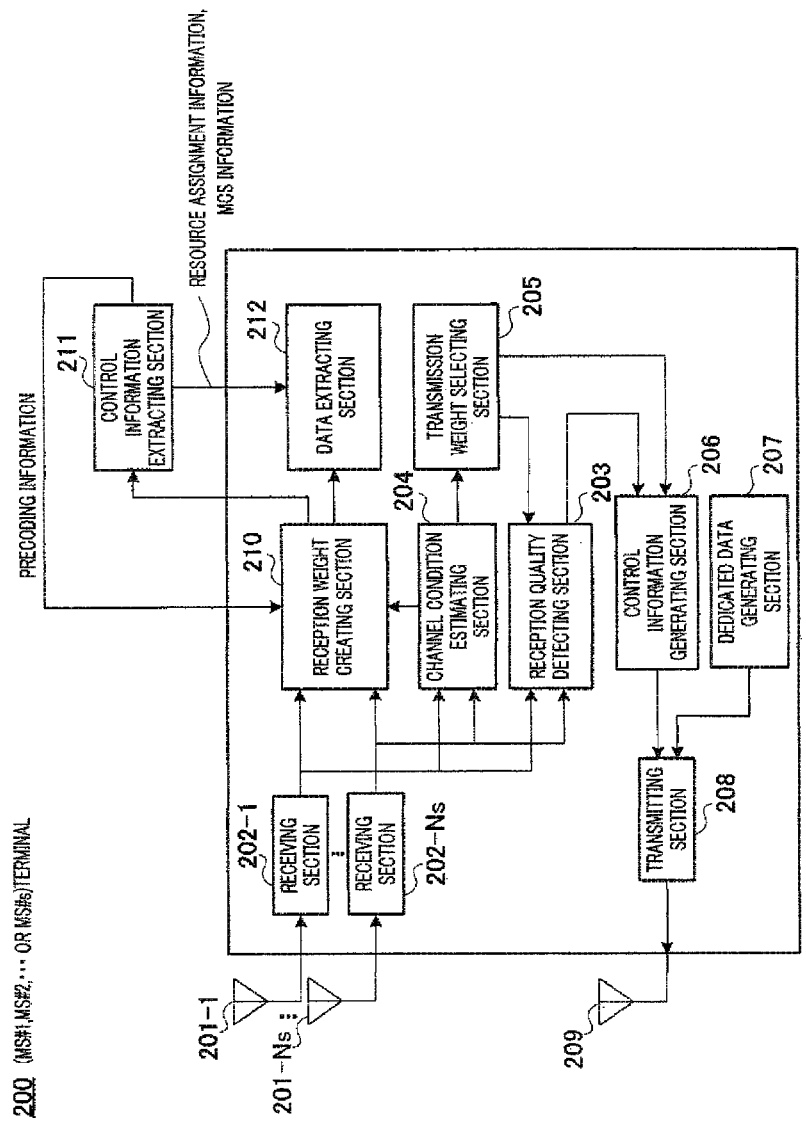

| NUMBER OF SPATIAL MULTIPLEXING (Ns) | MULTICAST ID INFORMATION |
|---|---|
| 2 | MID(2) |
| 3 | MID(3) |
| 4 | MID(4) |

FIG.9

| MULTICAST ID INFORMATION | RECEPTION CAPABILITY |
| --- | --- |
| MID(2) | RECEPTION IS POSSIBLE |
| MID(3) | RECEPTION IS POSSIBLE |
| MID(4) | RECEPTION IS IMPOSSIBLE |

FIG.11

| NUMBER OF SPATIAL MULTIPLEXING (Ns) | MODE INFORMATION AT THE TIME OF MULTIUSER MIMO |
|---|---|
| 2 | MU-MODE(2) |
| 3 | MU-MODE(3) |
| 4 | MU-MODE(4) |

FIG.13

| MODE INFORMATION AT THE TIME OF MULTIUSER MIMO | RECEPTION CAPABILITY |
|---|---|
| MU-MODE(2) | RECEPTION IS POSSIBLE |
| MU-MODE(3) | RECEPTION IS POSSIBLE |
| MU-MODE(4) | RECEPTION IS IMPOSSIBLE |

BASE STATION DEVICE AND TERMINAL DEVICE

TECHNICAL FIELD

The present invention relates to a base station apparatus and a terminal apparatus, using a multiuser MIMO (Multiple-Input Multiple-Output) technology.

BACKGROUND ART

In recent years, there is an increasing demand to increase capacity and speed of radio communication, and therefore methods for improving the utilization rate of finite frequency resources are being actively studied. As one of them, a technique for using the spatial domain gathers attention. An adaptive array antenna (adaptive antenna) has been known as one of techniques for using the spatial domain. This adaptive array antenna sensitively receives signals coming from a desired direction and prevents signals in interference wave directions by adjusting amplitudes and phases, using weighting factors by which received signals are multiplied. By this means, it is possible to reduce interference between identical channels and improve communication capability of a radio communication system.

In addition, as other techniques for using the spatial domain, a SDMA (Space Division Multiple Access) technique for transmitting varying data sequences to varying terminal apparatus and a SDM (Space Division Multiplexing) technique for transmitting varying data sequences to one terminal apparatus, by utilizing spatial orthogonality in channels and using physical channels at the same time, the same frequency and the same code.

A SDMA technique can be used when the spatial correlation coefficient between terminal apparatuses are lower than a predetermined value and improves the throughput and the capacity to accommodate users at a time in a radio communication system (see Non-Patent Literature 1).

Meanwhile, a SDM technique realizes SDM transmission under a propagation environment in which correlation of received signals between antennas is low, by providing a plurality of antenna elements in each of a transmitter and a receiver (see Non-Patent Literature 2). In this case, a transmitter transmits varying data sequences from a plurality of equipped antennas on a per antenna element basis, using physical channels at the same time, the same frequency and the same code. A receiver performs reception processing by demultiplexing varying data sequences from signals received by a plurality of equipped antennas, based on a channel response per antenna. As described above, by using a plurality of spatially multiplexed channels, it is possible to achieve higher speed without increasing M-ary modulation values. When SDM transmission is performed in an environment in which there are a number of scatterers between a transmitter and a receiver under a satisfactory S/N (signal-to-noise ratio) condition, if the transmitter has the same number of antennas as those in the receiver, it is possible to increase communication capacity in proportion to the number of antennas.

In addition, a multiuser MIMO technology has been known as a technology combining a SDMA technology and a SDMA technology. A multiuser MIMO technology has already been discussed in standardization of next-generation radio communication systems. For example, a draft of 3GPP-LTE standardization includes a transmission scheme in the downlink using multiuser MIMO (see Non-Patent Literature 3). Here, a scheme is employed where known several sets of beams (precoding vectors) are prepared, a terminal apparatus selects a precoding vector exhibiting good reception quality and feeds back information about its index to a base station apparatus.

When multiuser MIMO transmission is used, a base station apparatus needs to report assignment information to terminals in advance. Now, a method of reporting assignment information to terminals will be explained, based on IEEE 802.16e specification. Here, a case in which data transmission is performed in the downlink, will be used as an example.

FIG. 1 shows a radio frame using TDD in IEEE 802.16e standard (see Non-Patent Literature 4).

A terminal apparatus establishes time synchronization and frequency synchronization using a preamble signal. After that, the terminal apparatus establishes connection with a neighboring base station apparatus and receives CID (connection ID) information from the base station apparatus. Then, the terminal apparatus extracts broadcast information contained in a DL-MAP per frame, transmitted from the base station, and, when the CID directed to the terminal apparatus, also gets DL-burst position information and receives desiccated data signals (DL-bursts).

Now, detailed descriptions will be explained. When sending dedicated data to terminals (or users) in dedicated data fields (DL bursts) in the DL (downlink), a base station transmits signals in the DL, to all terminal apparatuses in the communication area by containing assignment information for each terminal apparatus in the signals, as broadcast information. In IEEE 802.16e, that broadcast information is included in a symbol field assigned to a DL-MAP field shown in FIG. 1.

FIG. 2 shows an example of main information included in a DL-MAP field. Burst information shows the position and the data length of a dedicated data transmission field (DL-burst) to transmit dedicated data using OFDM symbols following a DL-MAP. MIMO mode information shows, for example, whether the transmission mode is a spatial multiplexing mode, a time-space diversity transmission mode, or a multiuser MIMO transmission mode. Information about the number of spatially multiplexed signals (the number of spatial multiplexing) shows the number of spatially multiplexed signals, which are transmitted from a base station apparatus.

When multiuser MIMO is applied, in addition to these pieces of information, CID (connection ID) information, MCS (modulation and coding scheme) information and PVI (pre-coding vector index) information are contained in the DL-MAP field, and the result is reported. Here, CID information is information indicating the identification number (ID number) assigned in advance to a terminal apparatus to be the destination of dedicated data. MCS information is information indicating the M-ary modulation value and coding data of a stream subject to spatial multiplexing transmission. PVI information is index information indicating a precoding vector used by the base station at the time of precoding.

These pieces of CID information, MCS information and PVI information are assigned per terminal apparatus as shown in FIG. 2.

That is, in the figure, CID1 MCS1 and PVI1 show information assigned to terminal 1, and CID2 MCS2 and PVI2 show information assigned to terminal 2. The base station broadcasts CID1, MCS1, PVI1 to CIDn, MCSn and PVIn to not only the corresponding terminal apparatuses, but also all terminal apparatuses. By this means, a terminal apparatus can receive MMSE (minimum mean square error) by receiving not only PVI information assigned to the terminal but also assigned to other terminals, and therefore accurately demultiplex a signal directed to the terminal, from signals resulting from spatially multiplexing the signal directed to the terminal and signals directed to other terminal apparatuses.

Here, for reference, formats for single user MIMO transmission to report assignment information to terminal apparatuses, which are suggested in IEEE 802.16e, are shown in FIG. 3A and FIG. 3B.

CITATION LIST

Patent Literature

[PTL 1] Japanese Patent Application Laid-Open No. 2006-005908

Non-Patent Literature

[NPL 1] T. Ohgane et al, "A study on a channel assignment scheme with an adaptive array in SDMA", IEEE 47th VTC, vol. 2, 1997, p. 725-729
[NPL 2] G. J. Foschini, "Layered space-time architecture for wireless communication in a fading environment when using multi-element antennas", Bell Labs Tech. J, Autumn 1996, p. 41-59
[NPL 3] 3GPP TS36.211 V8.3.0 (2008, May)
[NPL 4] IEEE Std 802.16e™-2005, "IEEE Standard for Local and Metropolitan Area Networks-Part 16: Air Interface for Fixed and Mobile Broadband Wireless Access Systems-Amendment 2: Physical and Medium Access Control Layers for Combined Fixed and Mobile Operation in Licensed Bands"

SUMMARY OF INVENTION

Technical Problem

By the way, when multiuser MIMO transmission is performed, if a base station reports terminal assignment information to terminal apparatuses, the base station needs to report CID information, MCS information and PVI information to each user (terminal apparatus) subject to spatial multiplexing. Therefore, when the number of users subject to spatial multiplexing is greater, the amount of information required for reporting terminal assignment information, so that a problem that overhead in data transmission increases, and therefore efficiency of data transmission reduces, occurs.

For example, according to IEEE 802.16e standard, sixteen bits and four bits are used to report CID information and MCS information, respectively. Therefore, if six bits are used to report PVI information, when multiuser MIMO transmission is performed for four users, a total of (16+4+6)×4=104 bits are required to report CID information, MCS information and PVI information.

In addition, when multiuser MIMO transmissions are performed a number of times in a dedicated data transmission field (DL-burst), it is necessary to report a number of times user assignment information for these multiuser MIMO transmissions, so that a problem of an increase in overhead occurs. For example, when multiuser MIMO transmissions are performed N times, 104×N bits are required.

In view of these problems, the present invention provides to a base station apparatus and a terminal station apparatus able to reduce overhead caused by reporting user assignment information (dedicated control information) when multiuser MIMO transmission is performed.

Solution to Problem

One aspect of the present invention is a base station apparatus that performs multiuser MIMO transmission. The base station apparatus adopts a configuration to include: a spatially multiplexed signal forming section that forms signals spatially multiplexed and transmitted from a plurality of antennas; a common control signal forming section that forms a common control signal shared between the plurality of antennas and transmitted from the plurality of antennas; a dedicated control signal adding section that adds dedicated control signals directed to respective terminals, in the spatially multiplexed and transmitted signals.

One aspect of the present invention is a terminal apparatus that is able to demodulate a signal transmitted by multiuser MIMO. The terminal apparatus adopts a configuration to include: a channel estimating section; a reception weight creating section; and a control information extracting section, wherein: when a common control signal is received, the reception weight creating section obtains the common control signal using reception weight based on a channel matrix estimated by the channel estimating section, and the control information extracting section extracts resource assignment information and precoding information contained in the common control signal; and when spatially multiplexed signals are received, the reception weight creating section obtains dedicated data and a dedicated control signal using the reception weight based on the precoding information, and the control information extracting section extracts dedicated identifier information and modulation and coding scheme information contained in the dedicated control signal.

Advantageous Effects of Invention

According to the present invention, it is possible to realize a base station apparatus and a terminal apparatus able to reduce overhead caused by reporting user assignment information (dedicated control information) when multiuser MIMO transmission is performed.

BRIEF DESCRIPTION OF DRAWINGS

FIG. 2 shows an example of main information included in a DL-MAP region;
FIG. 3A shows a format for single-user MIMO transmission to report assignment information to a terminal apparatus, which is suggested in IEEE 802.16e;
FIG. 3B shows a format for single-user MIMO transmission to report assignment information to a terminal apparatus, which is proposed in IEEE 802.16e;
FIG. 5 shows a configuration example of OFDM frames according to an embodiment;
FIG. 6 is block diagram showing a configuration of a terminal apparatus according to Embodiment 1;
FIG. 9 explains multicast ID information.

FIG. 11 shows a list in which multicast ID information and reception capability categories of a subject terminal are associated with each other;

FIG. 13 explains mode information;

FIG. 15 shows a list in which mode information and reception capability categories of a subject terminal are associated with each other;

FIG. 22 explains layering of precoding information according to another embodiment; FIG. 22A shows a list in which a piece of MCS information is associated with pieces of precoding information; and FIG. 22B shows a list of pairs of pieces of MCS information and pieces of precoding information.

DESCRIPTION OF EMBODIMENTS

Now, embodiments of the present invention will be described in detail with reference to the accompanying drawings.

Embodiment 1

[1] A Configuration of a Base Station Apparatus

Figure 1:
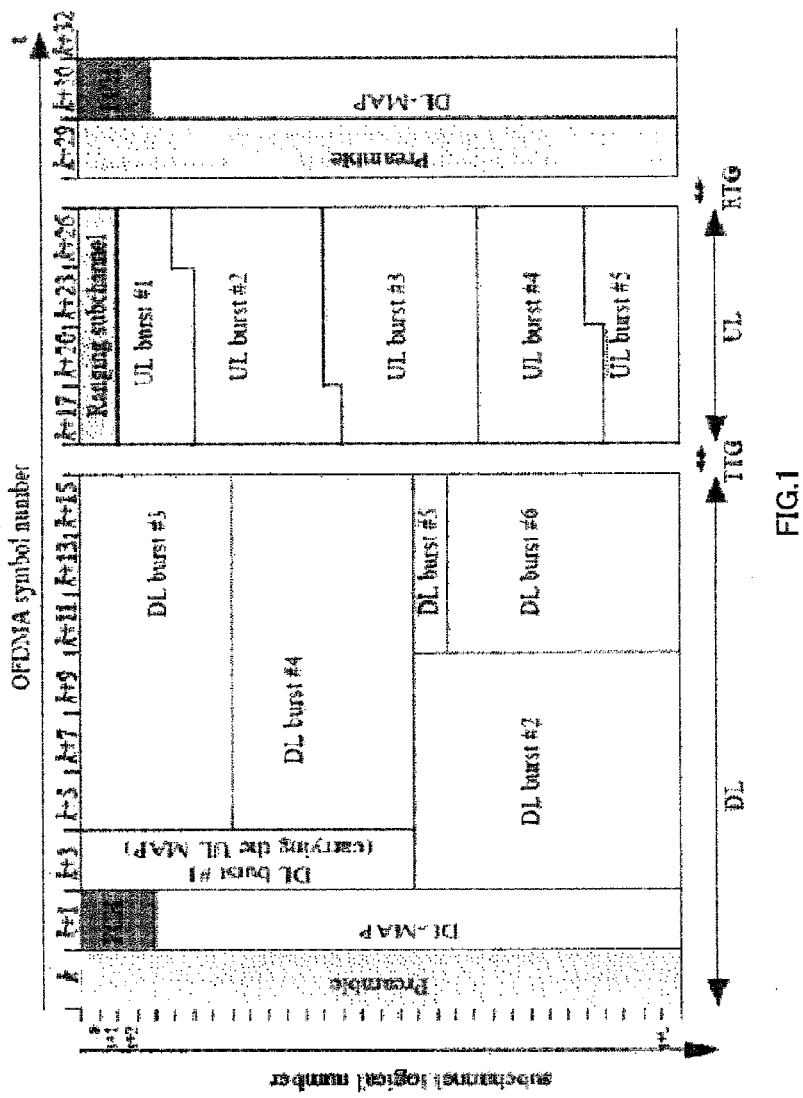
FIG. 1 shows a radio frame according to IEEE 802.16e standard.
Figure 4:
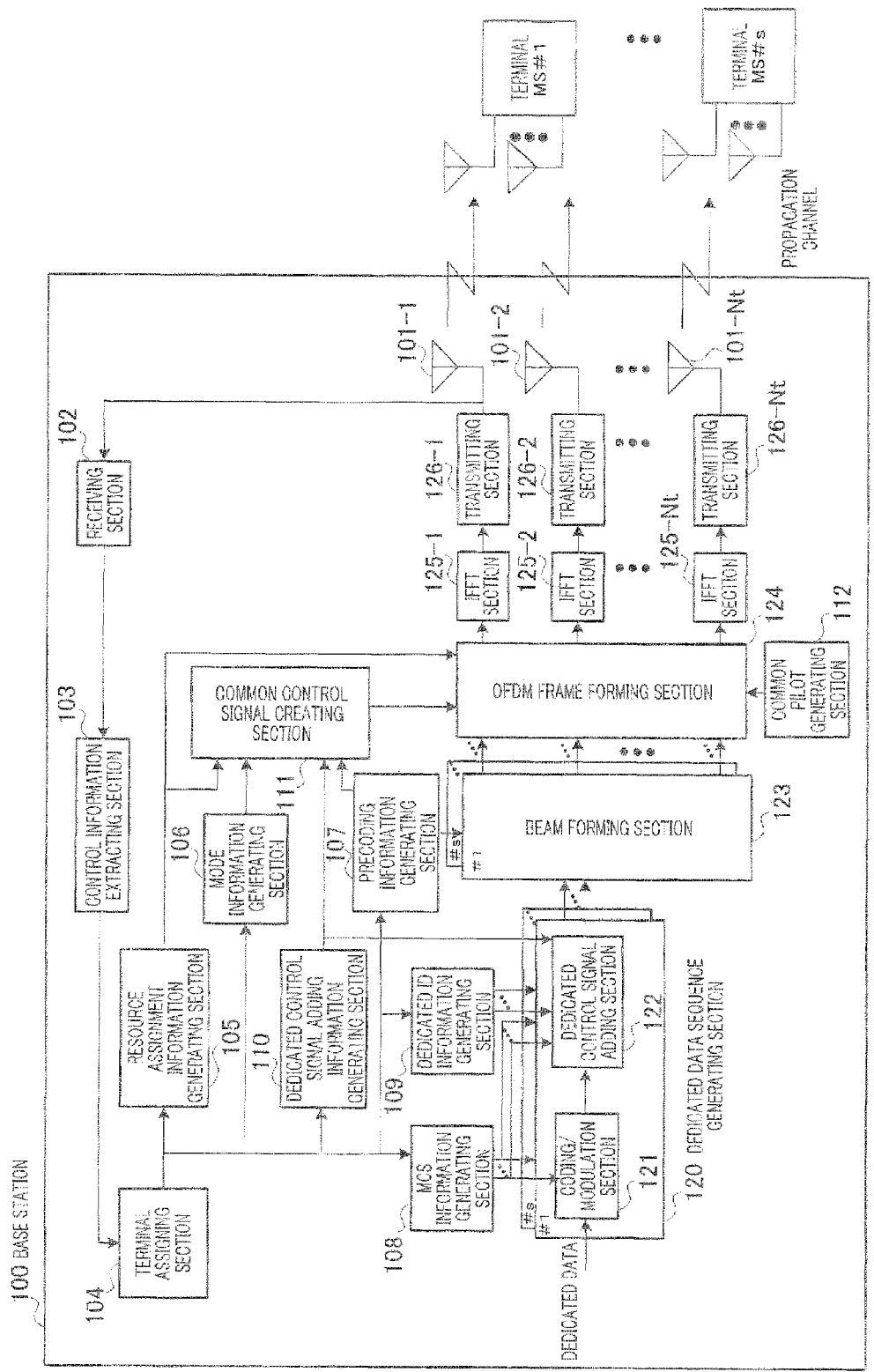
FIG. 4 is a block diagram showing a configuration of a base station apparatus according to Embodiment 1 of the present invention.

FIG. 4 shows a configuration of a base station apparatus (hereinafter abbreviated as "base station") according to Embodiment 1 of the present invention.

Base station 100 has a plurality of antennas 101-1 to 101-Nt that receive and transmit high-frequency signals.

Receiving section 102 demodulates and decodes received signals from antenna 101-1. Control information extracting section 103 extracts control information reported from terminal apparatuses (hereinafter abbreviated as "terminals") MS #1 to MS #s and outputs the extracted control information to terminal assigning section 104.

Terminal assigning section 104 assigns connection information to terminal MS #m, based on control information Terminal assigning section 104 outputs the connection information about assigned terminal MS #m, to resource assignment information generating section 105, mode information generating section 106, precoding information generating section 107, MCS information generating section 108, dedicated ID information generating section 109 and desiccated control signal adding information generating section 110. Here, m=1 to s.

Resource assignment information generating section 105 extracts resource assignment information from the connection information about assigned terminal MS #m, and generates resource assignment information according to a predetermined format.

Mode information generating section 106 extracts mode information from the connection information about assigned terminal MS #m, and generates mode information according to a predetermined format.

Precoding information generating section 107 extracts precoding information from the connection information about assigned terminal MS #m, and generates precoding information according to a predetermined format.

MCS information generating section 108 extracts MCS information from the connection information about assigned terminal MS #m, and generates MCS information according to a predetermined format.

Dedicated ID information generating section 109 extracts dedicated ID information from the connection information about assigned terminal MS #m, and generates dedicated ID information according to a predetermined format.

Dedicated control signal adding information generating section extracts mode information from the connection information about assigned terminal MS #m, and when the mode is a multiuser MIMO transmission mode, generates information indicating that a dedicated control signal is to be added, according to a predetermined format.

Common control signal forming section 111 forms a common control signal, based on respective pieces of information generated by resource assignment information generating section 105, mode information generating section 106, precoding information generating section 107 and dedicated control signal adding information generating section 110.

Common pilot generating section 112 generates a known signal sequence for each of antennas 101-1 to 101-Nt. This known signal sequence is multiplexed using time division multiplexing, frequency division multiplexing on a per OFDM subcarrier basis or code division multiplexing. Terminals MS #1 to MS #s in the receiving side demultiplex known sequence signals transmitted from transmission antennas 101-1 to 101-Nt and estimate MIMO propagation channels, based on demultiplexed known sequence signals.

Dedicated data sequence generating section 120 #1 to 120 #s form dedicated data sequences directed to terminals MS #1 to MS #3, respectively. To be more specific, dedicated data sequence generating section 120 #1 receives, as input, dedicated data directed to terminal MS #1 to form a dedicated data sequence directed to terminal MS #1.

Likewise, dedicated data sequence generating section 120 #2 to 120 #s receive, as input, dedicated data directed to terminals MS #2 to MS #s to form dedicated data sequences directed to terminals MS #2 to MS #s, respectively.

Each of dedicated data sequence generating sections 120 #1 to 120 #s has coding/modulation section 121 and dedicated control signal adding section 122.

Coding/modulation section 121 encodes and modulates dedicated data to be transmitted to terminal MS #m assigned by terminal assigning section 104, with a coding rate and an M-ary modulation value generated by MCS information generating section 108.

Dedicated control signal adding section 122 generates output to which a dedicated control signal is added if necessary, based on output information from dedicated control signal adding information generating section 110. That is, when output information from dedicated control signal adding information generating section 110 indicates that a control signal is to be added, dedicated control signal adding section 122 generates a dedicated control signal including MCS information and dedicated ID information, and adds this dedicated control signal to output from coding/modulation section 121.

If not so, dedicated control signal adding section 122 outputs the output from coding/modulation section 121 as is.

Each of beam forming section 123 #1 to 123 #s outputs signal $w_j x_s$ obtained by multiplying signal $x_s$ from dedicated control signal adding section 122, by transmission weight vector $V_t$ matching precoding information from precoding information generating section 107. Here, when the number of transmission antennas is Nt, transmission weight vector $V_t$ is represented by an Nt-order column vector having Nt vector elements $w_j$. Here, j=1, . . . , Nt.

OFDM frame forming section 124 maps output from beam forming section 123 #1 to 123 #s to subcarriers based on output from resource assignment information generating section 105. Moreover, OFDM frame forming section 124 forms an OFDM frame by mapping output from common pilot generating section 121 and output from common control signal forming section 111, to predetermined subcarriers.

IFFT sections 125-1 to 125-Nt perform IFFT processing on Nt outputs from OFDM frame forming section 124, add predetermined cyclic prefixes (or guard intervals) to Nt outputs after IFFT, and outputs the result. Transmitting sections 126-1 to 126-Nt transform baseband signals from IFFT sections 125-1 to 125-Nt to high-frequency signals in a carrier frequency band, and supply the result to antennas 101-1 to 101-Nt.

Figure 5A:
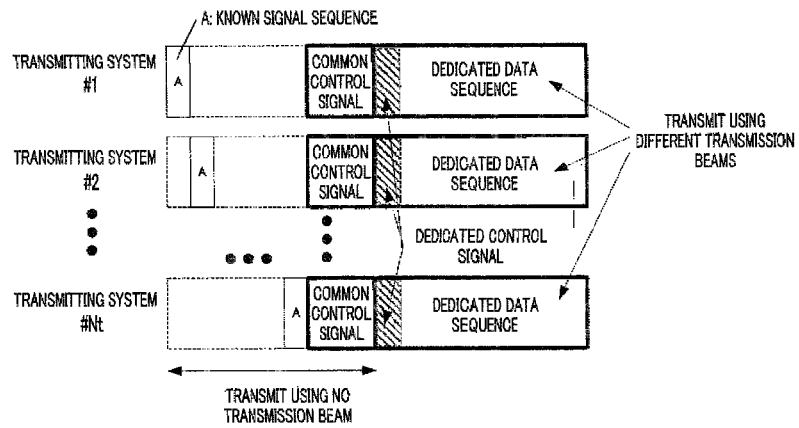
FIG. 5A is shown by focusing attention on signals at the time these are transmitted from antennas.
Figure 5B:
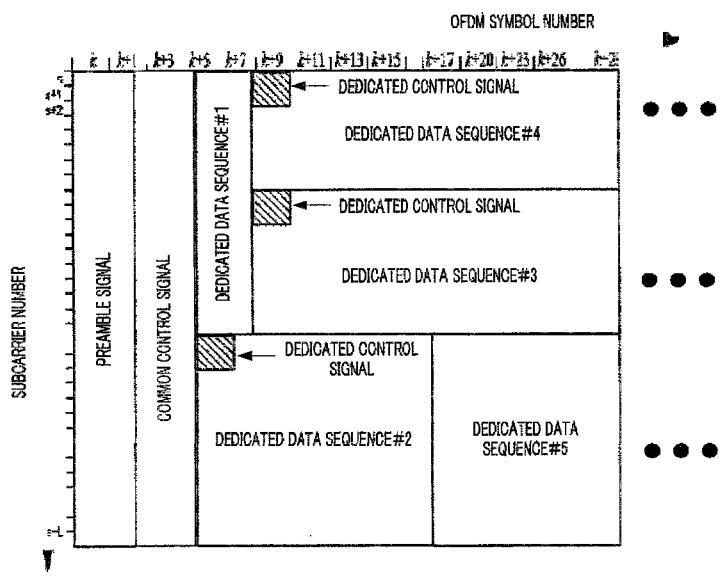
FIG. 5B is shown by focusing attention on signals at the time these are outputted from an OFDM frame forming section.

FIG. 5A and FIG. 5B show configuration examples of OFDM frames according to the present embodiment. FIG. 5A shows a configuration of an OFDM frame according to the present embodiment focusing on signals transmitted from antennas 101-1 to 101-Nt, respectively. In FIG. 5A, known signal sequences are outputted from common pilot generating section 112. A common control signal is outputted from common control signal forming section 111 and contains control information in a dedicated data sequence, such as resource assignment information, mode information, dedicated control signal adding information and precoding information, following this common control signal. Dedicated data sequences are outputted from beam forming section 123. A dedicated data sequence in the figure is a signal obtained by multiplying by transmission weight vector $V_t$ matching precoding information in beam forming section 123.

Here, a dedicated data sequence contains a dedicated control signal in a multiuser MIMO transmission mode. That is, according to the present embodiment, a dedicated control signal (MCS information and dedicated ID information) is added to a dedicated data sequence, and the dedicated control signal is transmitted along with the dedicated data sequence, using a transmission beam. As described above, dedicated ID information and MCS information are spatially multiplexed and transmitted to terminals, so that it is possible to reduce overhead when dedicated ID information and MCS information, which are user assignment information, are reported to terminals. Here, a common signal shared between antennas 101-1 to 101-Nt is transmitted from all antennas 101-1 to 101-Nt, as a common control signal, and at this time, a transmission diversity technique, such as CDD, STBC or SFBC is applied, so that it is possible to improve the reception quality of a common control signal.

FIG. 5B shows a different configuration example of an OFDM frame from in FIG. 5A focusing on signals at the time these are outputted from OFDM frame forming section 124. A preamble signal contains a known signal sequence, which is outputted from common pilot generating section 112. Alternatively, a known signal may be contained in part of subcarriers in each OFDM symbol. Among dedicated data sequences #1 to #5, dedicated data sequences #2 to #4 are dedicated data sequences transmitted by multiuser MIMO, contain respective dedicated control signals, and are transmitted using transmission beams. Meanwhile, dedicated data sequences #1 and #5 are desiccated data sequences transmitted by single-user MIMO, contain no dedicated control signal and are transmitted without using a transmission beam.

[2] A Configuration of a Terminal Apparatus

FIG. 6 shows a configuration of a terminal (MS #1, MS #2, . . . or MS #s).

Terminal 200 receives high-frequency signals from base station 100 through receiving antennas 201-1 to 201-Ns. Receiving sections 202-1 to 202-Ns transform received high-frequency signals to baseband signals.

Reception quality detecting section 203 detects reception quality, based on a baseband signal or a high-frequency signal. Channel condition estimating section 204 estimates a channel matrix as a channel condition. Transmission weight selecting section 205 selects appropriate transmission weight, based on the channel matrix.

Control information generating section 206 selects a precoding vector exhibiting good reception quality, based on output from reception quality detecting section 203 and output from transmission weight selecting section 205, and generates index information about this precoding vector, as control information. Dedicated data generating section 207 generates a dedicated data sequence directed to base station 100, based on a predetermined transmission format. Transmitting section 208 transforms output from control information generating section 106 and output from dedicated data generating section 207 to high-frequency signals in a carrier frequency band, and outputs the result to transmission antenna 209.

When receiving common control signals as input, reception weight creating section 210 creates reception weight to maximize the reception power (SNR) of the common control signal, based on the channel matrix obtained by channel condition estimating section 204, and obtains the common control signal by combining outputs from receiving sections 202-1 to 202-Ns using this reception weight. Reception weight creating section 210 outputs the common control signal to control information extracting section 211. Control information extracting section 211 extracts control information contained in the common control signal, that is, resource assignment information, mode information and precoding information used in terminals connected at the same time when multiuser MIMO transmission is performed, outputs precoding information, among these pieces of information, to reception weight creating section 210 and outputs resource assignment information to data extracting section 212.

When receiving dedicated data sequence signals as input, reception weight creating section 210 obtains the dedicated data sequence signal directed to terminal 200 by combining outputs from receiving sections 202-1 to 202-Ns using the reception weight created by precoding information. In the present embodiment, a dedicated data sequence signal contains a dedicated control signal and a dedicated data sequence, and received weight creating section 210 outputs the dedicated control signal to control information extracting section 211 and outputs the dedicated data sequence to data extracting section 212. Control information extracting section 211 outputs MCS information and so forth contained in a dedicated control signal, and data extracting section 212 demodulates and decodes a dedicated data sequence, according to this information.

Here, in FIG. 6, although receiving antennas 201-1 to 201-Ns are separated from transmission antenna 209, a configuration is possible where common antennas are shared for transmission and reception. In addition, a configuration is possible where a plurality of transmitting antennas and transmitting sections are provided to perform directional transmission.

[3] Communication Steps between a Base Station and Terminals

Next, communication processing steps between base station 100 and terminals 200 will be explained. Here, there are a plurality of terminals 200 in the communication area of base station 100, so that an m-th terminal in the communication area is referred to as "terminal MS #m", and communication processing steps between base station 100 and terminal MS #m will be explained.

Figure 7:
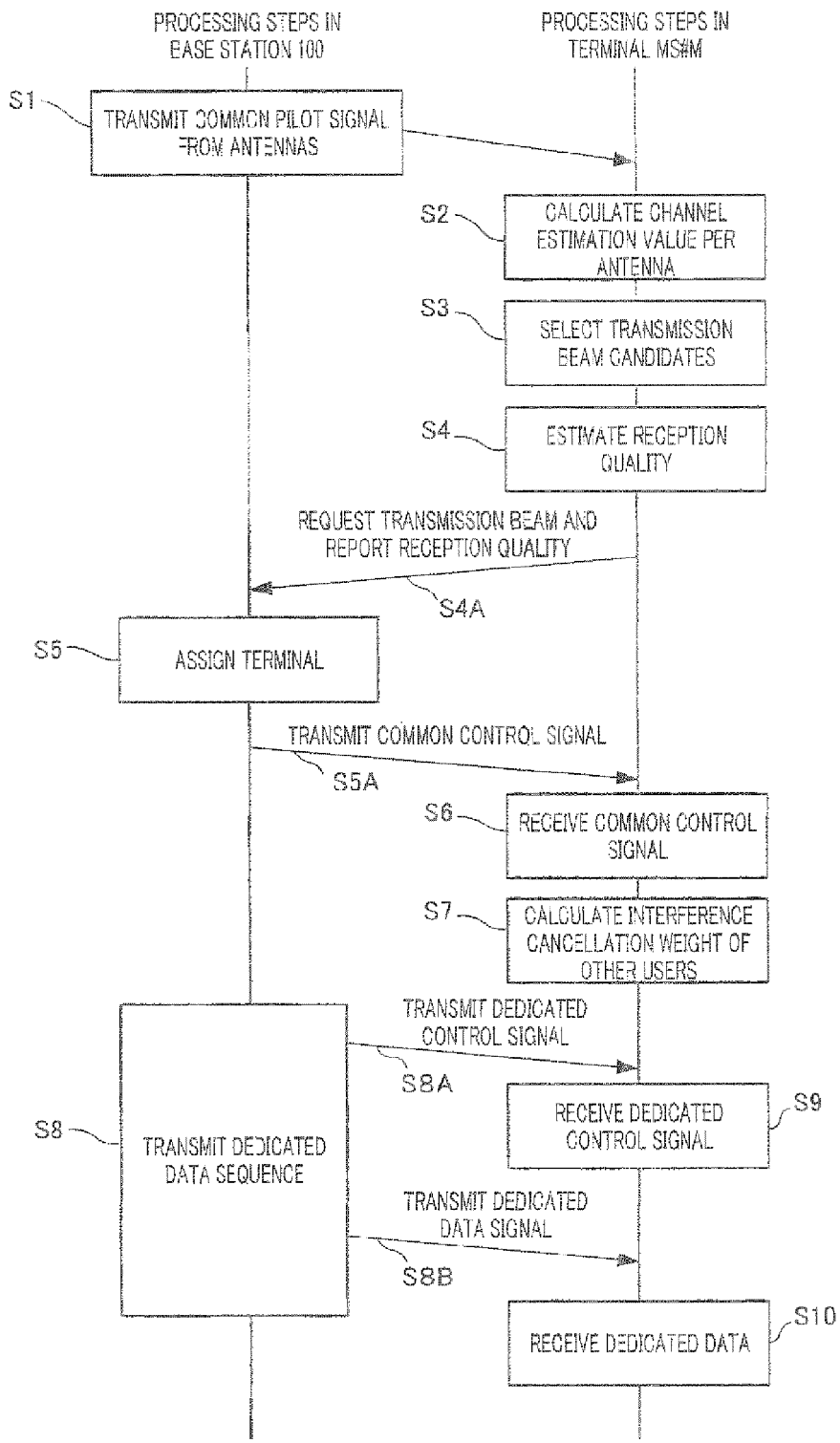
FIG. 7 shows communication processing steps between a base station and a terminal.

FIG. 7 shows communication processing steps between base station 100 and terminal MS #m. FIG. 7 shows operations after frame synchronization and symbol synchronization are established between base station 100 and terminal MS #m, and descriptions of operations associated with this establishment of synchronization is omitted.

Base station 100 transmits a known signal sequence (hereinafter referred to as "common pilot signal $AP_k(t)$") composed of a predetermined number of symbols Np, from each of Nt antennas 101-1 to 101-Nt (step S1). Here, k represents respective numbers of antennas 101-1 to 101-Nt and transmitting sections 126-1 to 126-Nt in base station 100, where k=1, 2, ..., Nt. In addition, t=1, ..., Np.

Terminal MS #m residing in a communication area, receives common pilot signal $AP_k(t)$ transmitted from each of antennas 101-1 to 101-Nt by receiving antennas 201-1 to 201 Ns, and calculates a channel estimation value by channel condition estimating section 204, using that received signal (step S2). Now, calculation of this channel estimation value will be explained. M-th terminal MS #m residing in the communication area has Ns (m) antennas and Ns (m) receiving systems, and therefore can perform MIMO reception using maximum Ns (m) spatially multiplexed channels.

Here, "m" is a natural number equal to or smaller than the number of terminals $N_{ms}$ in the communication area. With respect to k-th common pilot signal $AP_k(t)$, channel condition estimating section 204 calculates channel estimation values $h^m(j, k)$ of a transmission channel by performing correlation computation of $r^{(m)}_{j,k}(t)$ (here, j=1, ..., Ns(m)) resulting from receiving by the j-th antenna and receiving system in m-th terminal MS #m and a replica of $AP_k(t)$ generated inside terminal MS #m, as shown in equation 1. Here, * represents an operator to calculate complex conjugate. Ultimately, a total number of channel estimation values using m-th terminal MS #m is (the number of dedicated pilot signals per antenna Nt)×(the number of antennas Ns (m) in terminal MS #m.

(Equation 1)

$$h^m(j, k) = \frac{1}{N_p} \sum_{t=1}^{N_p} AP_k^*(t) r_{j,k}^{(m)}(t) \quad [1]$$

In addition, as shown in equation 2, channel matrix H (m) has an element represented by the obtained channel estimation value $h^m(j, k)$, where the element is placed in j-th row and k-th column in a matrix, (Equation 2)

$$H(m) = \begin{bmatrix} h^m(1, 1) & h^m(1, 2) & \ldots & h^m(1, N_s) \\ h^m(2, 1) & h^m(2, 2) & \ldots & h^m(2, N_t) \\ \vdots & \vdots & \vdots & \vdots \\ h^m(N_s(m), 1) & h^m(N, (m), 2) & \ldots & h^m(N_s(m), N_t) \end{bmatrix} \quad [2]$$

Transmission weight selecting section 205 selects a predetermined number Nsel equal to or smaller than Ns (m) of transmission beams, from transmission precoding beam candidates in each terminal MS #m, using calculated channel estimation values (step S3). Note that when a transmission beam is selected from transmission precoding beam candidates, base station 100 and terminal MS #m share in advance predetermined transmission precoding weight candidate $W_n$ from base station 100, as a precoding weight table transmitted from base station 100. Here, n is a natural number equal to or smaller than predetermined number $N_b$. As a precoding weight table transmitted from base station 100, precoding weights, such as Fourier beams that satisfy unitarity and are orthogonal to each other, are used.

Selection of transmission precoding beam candidates is performed as follows (step S3). In selection of this transmission beam candidates, different operations are performed between when the number Nsel selected from transmission precoding beam candidates is value 1 and when the number Nsel is value equal to or greater than 2. Now, a method for selecting transmission beam candidates when the number Nsel is value 1, will be explained. A case in which the number Nsel is value 2, is described, for example, in Patent Literature 1, so that descriptions will be omitted.

In a Case of Nsel=1

In this case, transmission weight to maximize reception power is selected, from transmission weight candidates $W_n$ in a precoding weight table transmitted from base station 100. That is, maximum transmission weight $T_1(m)$ satisfying equation 3 is selected. Here, n is a natural number equal to or smaller than predetermined number $N_b$.

(Equation 3)

$$T_n(m) = \arg\left\{w_n \mid \max_n (|H(m)w_n|^2)\right\} \quad [3]$$

Next, reception quality detecting section 203 predicts and estimates the reception quality for each terminal MS #m when a signal is transmitted using a selected transmission beam (step S4). As this reception quality, reception signal power, SIR (signal power to interference power ratio), SNR (signal power to noise power ratio) and so forth are applicable, where a case using SNR is shown. When SNR is evaluated using common pilot signal $AP_k(t)$, $L_n(m)$ is calculated as SNR in a case in which an n-th transmission beam in terminal MS #m is used, as shown in equation 4.

(Equation 4)

$$L_n(m) = \frac{T_n(m)}{N(m)} \quad [4]$$

Here, N(m) represents noise power and is calculated using equation 5.

(Equation 5)

$$N(m) = \frac{1}{Ns(m)NtNp} \sum_{j=1}^{Ns(m)} \sum_{k=1}^{Nt} \sum_{i=t}^{Np} |AP_k^*(t)r_{j,k}^{(m)}(t) - h^m(j,k)|^2 \quad [5]$$

Here, when SIR is calculated, for example, when the maximum radio combining beam is formed and received in the terminal MS #m side in order to receive this transmission beam, received signal power for signals transmitted by transmission beams excluding this transmission beam is regarded as an interference component.

Next, control information generating section 206 generates control information, based on output from transmission weight selecting section 205 and output from reception quality detecting section 203. Dedicated data generating section 207 outputs a signal obtained by applying predetermined channel coding and modulation to a data signal specific to terminal 200. Transmitting section 208 forms a baseband signal composed of a transmission data sequence having a predetermined frame format, from output from control information generating section 206 and output from dedicated data generating section 207, transforms the baseband signal to a high-frequency signal by applying up-conversion processing, band limitation processing and amplification processing, and transmits the result from transmitting antenna 209.

Each terminal MS #m reports Nsel transmission beams $T_n$ (m) (here, n=1 to $N_b$ (m)) and the reception quality obtained from each terminal MS #m, to base station 100 (step S4A). In this case, it is preferable to report transmission beams using numbers on a base station transmission weight table shared between base station 100 and terminal MS #m. By this means, only information indicating transmission beam numbers is required, so that it is possible to reduce the amount of information to report transmission beams. In addition, it is possible to report reception quality by sharing a reception quality table subject to appropriate quantization between base station 100 and terminal MS #m and using numbers on this reception quality table. By this means, it is possible to limit the amount of information to only a predetermined number of quantization bits.

Here, as for another method of reporting reception quality, it is possible to report reception quality by sharing an M-ary modulation and coding rate table in which M-ary modulation numbers and coding rates are associated with each other between base station 100 and terminal MS #m, and by using numbers on the M-ary modulation and coding rate table, which match measured reception quality. By this means, it is possible to reduce the amount of information to report reception quality. This is commonly referred to as MCS information.

Meanwhile, base station 100 receives high-frequency signals transmitted from terminal MS #m by antennas 101-1 to 101-Nt, and extracts control information reported from terminal MS #m by control information extracting section 103. Then, terminal assignment section 104 takes into account the transmission beam reported from respective terminals MS #m and assigns terminal MS #m that should be communicated with base station 100 (step S5). A specific method for assigning terminals is described in Patent Literature 1 and so forth, so that descriptions are omitted here.

In base station 100, common control signal forming section 111 forms a common control signal from output signals from resource assignment information generating section 105, mode information generating section 106, dedicated control signal adding information generating section 110 and precoding information generating section 107, and transmits this common control signal to terminal MS #m, via OFDM frame forming section 124, IFFT sections 125-1 to 125 Nt, transmitting sections 126-1 to 126 to Nt and antennas 101-1 to 101-Nt (step S5A).

In addition, in base station 100, dedicated control signal adding section 122 adds a dedicated control signal including MCS information and dedicated ID information, to a dedicated data sequence; beam forming section 123 forms a transmission beam by multiplying the dedicated data sequence signal to which the dedicated control signal is added, by transmission weight vector $V_t$ matching precoding information; the signal formed into a transmission beam is transmitted to terminal MS #m, via OFDM frame forming section 124, IFFT sections 125-1 to 125-Nt, transmitting sections 126-1 to 126-Nt and antennas 101-1 to 101-Nt (steps S8, S8A and S8B).

As described above, base station 100 according to the present embodiment reports, to a terminal, resource assignment information indicating which resource is used to assign a dedicated data sequence, mode information, and information about transmission precoding beams used in terminals connected at the same time when multiuser MIMO transmission is performed, using a common control signal (step S5A).

In addition, base station 100 according to the present embodiment reports the dedicated ID information about terminal MS #m to report start of transmission of a dedicated data signal to terminal MS #m to which resources are assigned and MCS information in the dedicated data signal, to the terminal by using a dedicated control signal formed into a beam (step S8A).

Terminal MS #m receives a common control signal in step S6. At this time, in terminal MS #m, reception weight creating section 210 forms a reception weight to maximize the reception power (SNR) of a common control signal, based on a channel matrix obtained by channel condition estimating section 204, and combines outputs from receiving sections 202-1 to 202-Ns using this reception weight to obtain the common control signal. In addition, reception weight creating section 210 outputs the common control signal to control information extracting section 211. Control information extracting section 211 extracts control information contained in the common control signal, that is, resource assignment information, mode information, and precoding information used in terminals connected at the same time when multiuser MIMO transmission is performed, and, among these pieces of information, outputs precoding information to reception weight creating section 210 and outputs resource assignment information to data extracting section 212.

In addition, in terminal MS #m, reception weight creating section 210 calculates interference cancellation weight for cancelling interference from other terminals (users) in step S7.

Next, terminal MS #m receives a dedicated control signal in step S9, and receives dedicated data in step S10. Now, this reception processing in step S9 and step S10 will be explained in detail. Here, processing will be explained where the number of receiving systems in terminal MS #m is equal to or smaller than the number of spatial multiplexing at the time of multiuser MIMO transmission (that is, where receiving weight creating section 210 in a terminal can use linear weight).

In this case, signal $y_m(t)$ received by terminal MS #m is represented by equation 6. Here, t represents time. $y_m(t)$ represents a column vector having the element number corresponding to the number of receiving system Ns(m). x(t) represents a column vector having s elements and indicating a data sequence to transmit to terminal MS #m. In addition, channel matrix H(m) is from the result of estimating channel conditions using a common pilot signal in channel condition estimating section 204. Moreover, $T_j$ represents a transmission precoding beam (precoding information) obtained from a common control signal. Here, j=1, . . . , s.

[6]

$$y_m(t)=H(m)[T_1 \cdot T_s]x(t)=B(m)x(t) \qquad \text{(Equation 6)}$$

In this case, since the number of spatial multiplexing is equal to or smaller than the number of receiving systems in terminal MS #m, it is possible to calculate linear reception weight G(m) based on the ZF or MMSE criterion. In addition, as shown in equation 7, it is possible to demultiplex dedicated data sequence signal x(t) from spatially multiplexed and transmitted signals by multiplying received signal $y_m(t)$ by obtained G(m).

[7]

$$x(t)=G(m)y_m(t) \qquad \text{(Equation 7)}$$

Control information extracting section 211 refers to dedicated control signal adding information contained in a dedicated control signal, and when a dedicated control signal is contained in a dedicated data sequence signal, extracts information contained in the dedicated control signal. That is, control information extracting section 211 extracts a dedicated control signal from signals outputted from reception weight creating section 210, demodulates the dedicated control signal, performs channel error correction on a demodulated dedicated control signal, and decodes the result to restore control information (step S9). By this means, MCS information and dedicated. ID information contained in a dedicated control signal are extracted.

Next, in terminal MS #m, when dedicated ID information contained in a dedicated control information is directed to terminal MS #m, data extracting section 212 extracts a dedicated data signal whose dedicated ID information is directed to terminal MS #m, from signals outputted from reception weight creating section 210, demodulates the dedicated data signal based on MCS information contained in the dedicated control signal, performs channel error correction on a modulated dedicated data signal, and decodes the result to restore dedicated data (step S10).

[4] Effects and Variations

As described above, according to the present embodiment, dedicated ID information and MCS information are spatially multiplexed and transmitted to a terminal by containing a dedicated control signal in a dedicated data sequence signal spatially multiplexed at the time of multiuser MIMO transmission, so that it is possible to reduce overhead when dedicated ID information and MCS information which are user assignment information, are reported to the terminal, and therefore it is possible to improve efficiency of use of frequencies in a radio communication system.

Here, with the present embodiment, although a case has been described where dedicated ID information and MCS information are spatially multiplexed and transmitted, this is by no limiting, and the important thing is that transmission format information (in other words, user assignment information) regarding a dedicated data signal is spatially multiplexed and transmitted to a terminal. In this way, it is possible to reduce overhead caused by reporting user assignment information when multiuser MIMO transmission is performed.

In addition, with the present embodiment, although dedicated ID information, and MCS information as transmission format information regarding a dedicated data signal are contained in a dedicated control signal, dedicated data signal power information may be contained in a dedicated control signal. In this case, based on the transmission power of a common pilot signal, a base station regards an offset value of a dedicated data signal as dedicated data signal power information. In a terminal, when extracting information about a dedicated control signal, control information extracting section 211 extracts dedicated data signal power information, together with MCS information and dedicated ID information contained in the dedicated control signal. In a terminal, when the dedicated ID information contained in the dedicated control signal is directed to the terminal, data extracting section 212 extracts a dedicated data signal whose dedicated ID information is directed to the terminal, from signals outputted from reception weight creating section 210, and demodulates the dedicated data signal, based on MCS information contained in the dedicated control signal and dedicated data signal power information.

Embodiment 2

Figure 8:
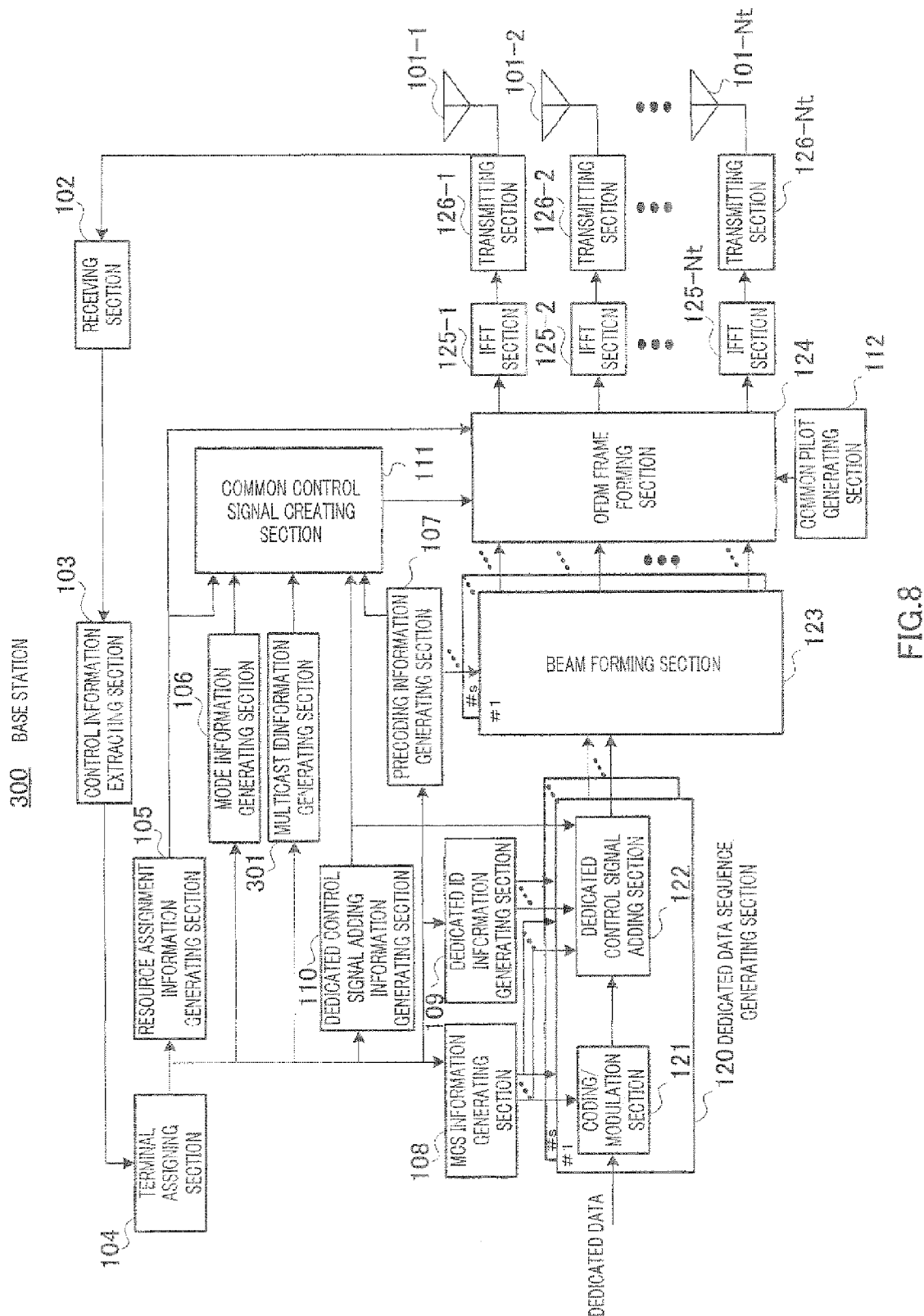
FIG. 8 is a block diagram showing a configuration of a base station apparatus according to Embodiment 2.

FIG. 8 shows base station 300 according to the present embodiment, where the same components as in FIG. 4 are assigned the same reference numerals. Base station 300 has multicast ID information generating section 301, in addition to components in base station 100 (FIG. 4) according to Embodiment 1.

Multicast ID information generating section 301 generates multicast ID information MID, based on the number of spatial multiplexing at the time of multiuser MIMO transmission contained in terminal connection information from terminal assigning section 104, and outputs this multicast ID information MID to common control signal forming section 111.

Multicast ID information generated by multicast ID information generating section 301 is information linked to interference cancellation capability of a terminal. To be more specific, multicast ID information MID is linked to the number of spatial multiplexing of transmission signals, as shown in FIG. 9.

Multicast ID information is numerical information represented by, for example, sixteen bits. Here, likewise, numerical values represented by sixteen bits are used to represent dedicated ID information, and it is possible to use dedicated ID information and multicast ID information at the same time by assigning numerical values other than the numerical value used to represent multicast ID information, to dedicated ID information. In this way, it is possible to use the same transmission format between dedicated ID information and multicast ID information, so that a receiving apparatus (terminal) can support, for example, switching between dedicated ID information and multicast ID information, by changing a small number of components.

In addition, for example, among sixteen bits of multicast ID information, two low-order bits may be associated with the number of spatial multiplexing at the time of multiuser MIMO, and the other high-order bits may be configured for multicast ID information used for multiuser MIMO. By this means, when multicast ID information at the time of multiuser MIMO is found in high-order bits, these two low-order bits are masked, so that it is possible to produce an effect that can easily extract the number of spatial multiplexing at the time of multiuser MIMO transmission.

Common control signal forming section 111 forms a common control signal containing multicast ID information MID, in addition to information generated by resource assignment information generating section 105, mode information generating section 106, precoding information generating section 107 and dedicated control signal adding information generating section 110.

Figure 10:
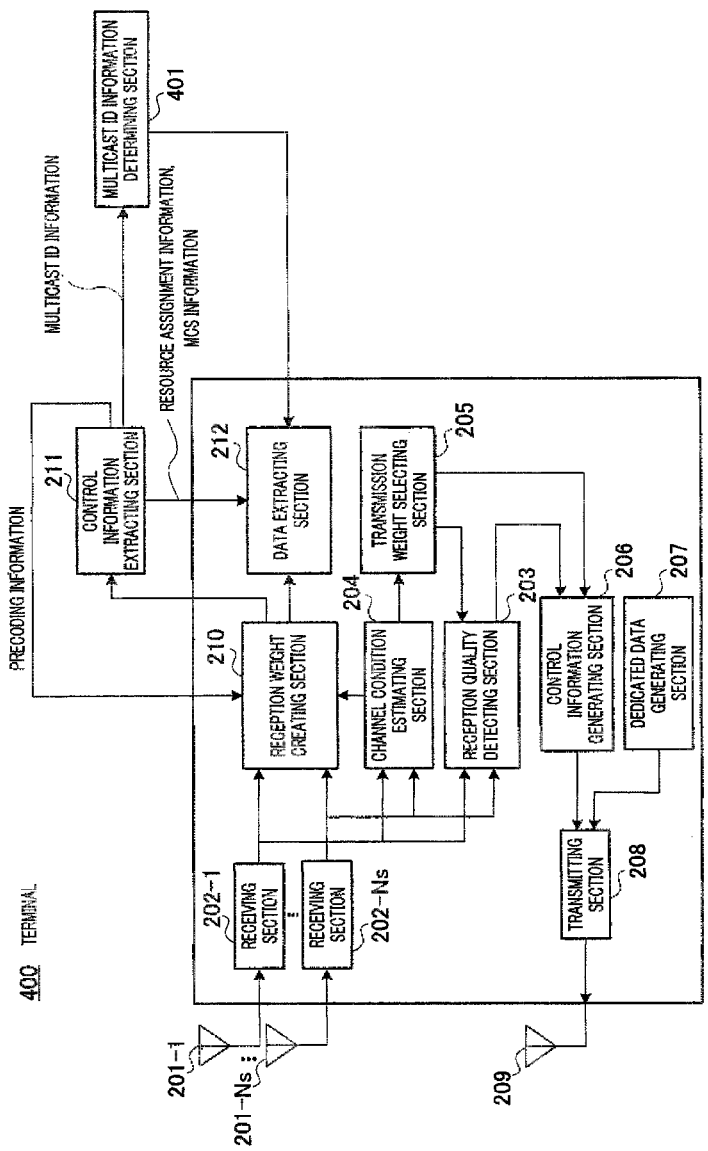
FIG. 10 is a block diagram showing a configuration of a terminal apparatus according to Embodiment 2.

FIG. 10 shows terminal 400 according to the present embodiment, where the same components as in FIG. 6 are assigned the same reference numerals. Terminal 400 has multicast ID information determining section 401, in addition to components in terminal 200 (FIG. 6) according to Embodiment 1.

Multicast ID information determining section 401 receives, as input, multicast ID information extracted from a common control signal by control information extracting section 211.

As shown in FIG. 11, multicast information determining section 401 stores a list representing that reception is possible or impossible, based on associations between multicast ID information and reception capability categories of terminal 400 (the number of spatial multiplexing able to be received by terminal 400). Multicast ID information determining section 401 determines whether or not terminal 400 can receive spatially multiplexed signals transmitted from base station 100, based on the stored list and multicast ID information obtained from control information extracting section 211. FIG. 11 shows an example of a list in which the interference cancellation capability of terminal 600 (the number of spatial multiplexing that can be received by terminal 600) is 3. Multicast ID information determining section 401 outputs information indicating whether or not dedicated data sequences spatially multiplexed and transmitted can be received, to data extracting section 212.

That is, with the present embodiment, the number of receiving systems is not the same between all terminals MS #m, and it is assumed that there is a terminal having a smaller number of receiving systems than the number of spatial multiplexing at the time of multiuser MIMO transmission in the communication area. Here, assume that terminals assigned to multiuser MIMO transmission can receive signals using linear weight by reception weight creating section 210.

Terminal 400 changes operations to receive a dedicated data sequence (steps S9 and S10 in FIG. 7), based on outputs from multicast ID information determining section 401. That is, upon determining that multicast ID information determining section 401 cannot receive a dedicated data sequence, terminal 400 does not perform operations to receive a dedicated data sequence (step S9 and step S10 in FIG. 7), and, on the other hand, upon determining that multicast ID information determining section 401 can receive a dedicated data sequence, performs operations to receive a dedicated data sequence (step S9 and step S10 in FIG. 7).

As described above, according to the present embodiment, in addition to Embodiment 1, static multicast ID information linked to interference cancellation capability of a terminal (the number of spatial multiplexing able to be received by a terminal) is contained in a common control signal and reported to the terminal, so that it is possible to control whether or not the terminal can receive dedicated data signals.

By this means, a terminal does not receive spatially multiplexed dedicated control signals beyond interference cancellation capability of the terminal, and therefore need not perform unnecessary reception operations. As a result of this, a terminal reduces its power consumption.

In addition, a terminal can cancel dedicated control signals directed to other terminals by assigning multicast IDs to a plurality of terminals having a certain level of interference cancellation capability, according to the number of spatial multiplexing at the time of multiuser MIMO transmission, and therefore, can ensure the reception quality of a dedicated control signal directed to the terminal.

Here, new overhead directly due to use of multicast ID information does not occur by assigning static multicast IDs fixed in advance.

Figure 12:
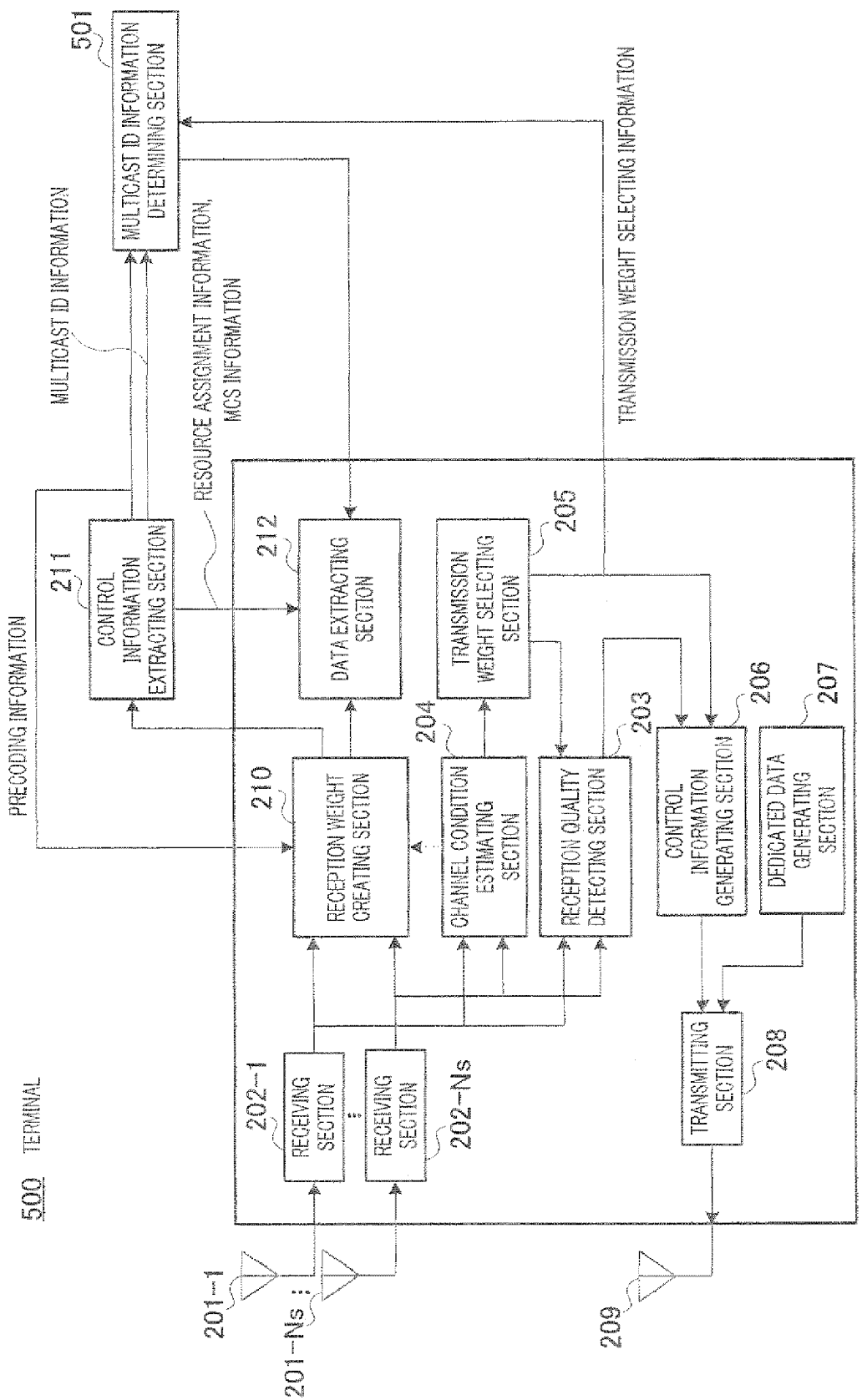
FIG. 12 is a block diagram showing a configuration example of a terminal apparatus according to Embodiment 2.

FIG. 12 shows another configuration example of a terminal, where the same components as in FIG. 10 are assigned the same reference numerals. The configuration of multicast ID information determining section 501 in terminal 500 differs from that of multicast ID information determining section 401 in terminal 400 (FIG. 10).

Multicast ID information determining section 501 receives precoding information from control information extracting section 211, as input, and receives transmission weight selecting information from transmission weight selecting section 205, as input.

Multicast ID information determining section 501 stores transmission weight selecting information (transmission precoding beam) selected in transmission weight selecting section 205. In addition, as described above, multicast ID information determining section 510 stores a list representing that reception is possible or impossible, based on associations between multicast ID information and reception capability categories of terminal 500 (the number of spatial multiplexing able to be received by terminal 500).

When the precoding information extracted by control information extracting section 211 matches the transmission precoding beam selected by transmission weight selecting section 205 and the multicast ID information extracted by control information extracting section 211 represents the number of spatial multiplexing that can be received by terminal 500, multicast ID information determining section 501 determines that terminal 500 can receive a dedicated data sequence spatially multiplexed and transmitted.

That is, terminal 500 does not receive spatially multiplexed dedicated control signals beyond the interference cancellation capability of terminal 500. In addition, when precoding information reported from base station 100 does not match the transmission precoding beam (transmission weight selecting information) selected by terminal 500, terminal 500 determines that there is no dedicated data signal directed to terminal 500, and receives no dedicated data signal. By this means, a terminal needs not to perform unnecessary reception operations, and therefore reduces its power consumption accordingly.

Here, with the present embodiment, although static multicast IDs (MIDs) linked to interference cancellation capability of a terminal (the number of spatial multiplexing able to be received by a terminal) are used, a technique for dynamically assigning multicast IDs may be used as another method. In this case, after assignment of terminals to perform transmission (S5 in FIG. 7) and before the timing to transmit a common control signal (S5A in FIG. 7), one specific multicast ID is reported to a plurality of terminals that perform multiuser MIMO transmission. By this means, although overhead due to dynamic assignment of a multicast ID increases, only a plurality of terminals that perform multiuser MIMO transmission perform operations to receive dedicated control signals, with respect to one specific multicast ID. As a result of this, a terminal need not perform unnecessary reception processing on dedicated data sequences not directed to the terminal.

Embodiment 3

Although the configuration of a base station according to the present embodiment is approximately the same as the configuration of base station 100 in FIG. 4 described in Embodiment 1, operations of mode information generating section 106 differ from in base station 100. With the present embodiment, mode information generating section 106 generates mode information MU-MOD (Ns) at the time of multiuser MIMO, which varies according to the number of spatial multiplexing at the time of multiuser MIMO transmission contained in terminal connection information from terminal assigning section 104, and outputs this mode information MU-MOD (Ns) to common control signal forming section 111. To be more specific, mode information generating section 106 generates mode information MU-MOD (Ns) as shown in FIG. 13.

Mode information is numerical information represented by, for example, four to six bits. Here, a configuration is possible where two low-order bits are assigned as mode information at the time of multiuser MIMO, and the other high-order bits are configured to represent mode information at the time of multiuser MIMO. By this means, when mode information at the time of multiuser MIMO is found in high-order bits, these two low-order bits are masked, so that it is possible to produce an effect that can easily extract mode information at the time of multiuser MIMO transmission.

Here, although multicast ID information is used to control whether or not a terminal receives a dedicated data signal in Embodiment 2, mode information is used in the present embodiment. It is possible to reduce the amount of information by using mode information as compared to use of multicast ID information (because multicast ID information needs numerical information about sixteen bits when multicast ID information is used together with dedicated ID information). Meanwhile, when mode information is used, reception needs to be controlled such that a common control signal does not contain ID information, so that it is necessary to change part of the configuration of a control system in a receiving apparatus (terminal).

Figure 14:
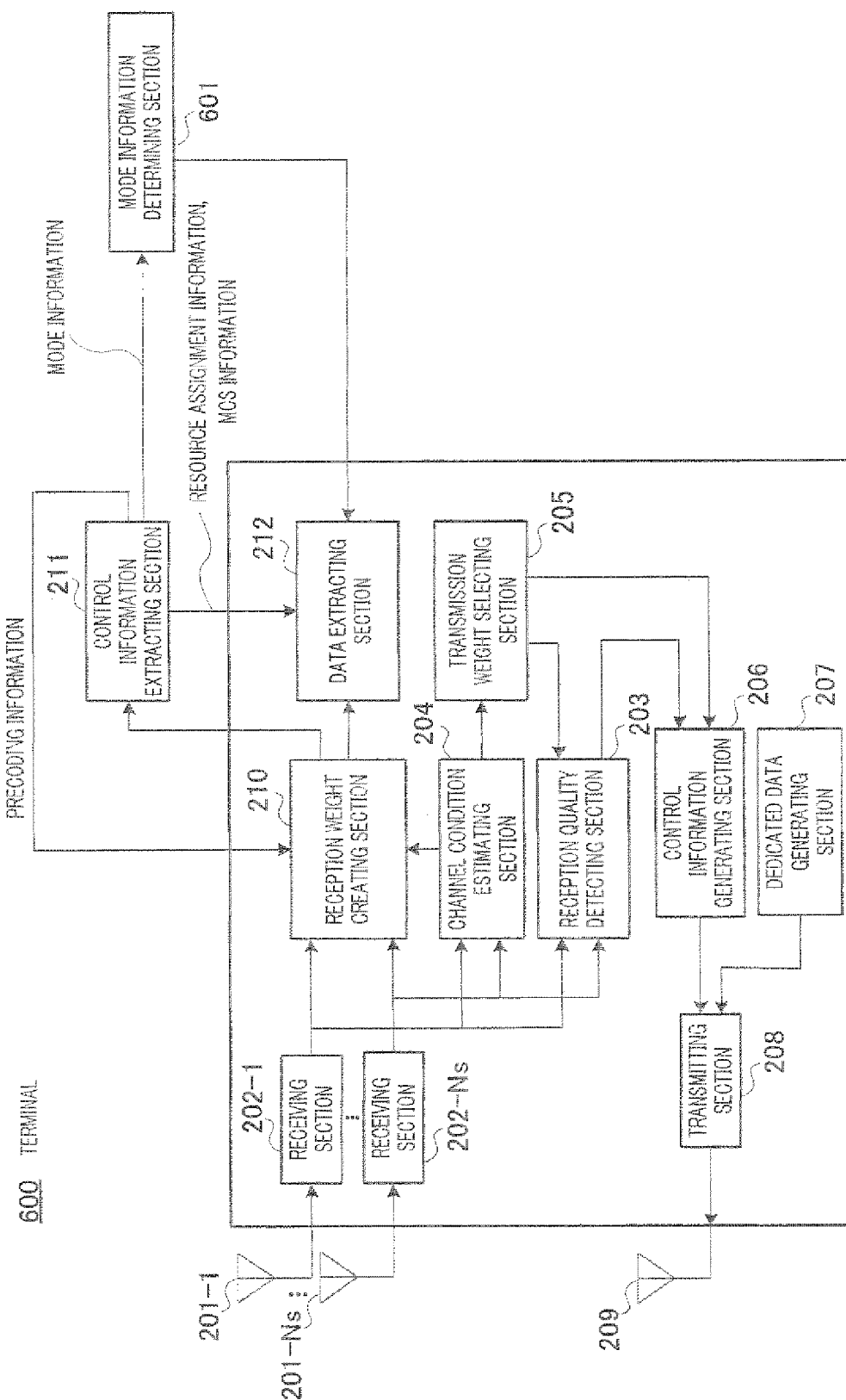
FIG. 14 is a block diagram showing a configuration of a terminal apparatus according to Embodiment 3.

FIG. 14 shows terminal 600 according to the present embodiment, where the same components as in FIG. 6 are assigned the same reference numerals. Terminal 600 has mode information determining section 601, in addition to components in terminal 200 (FIG. 6) according to Embodiment 1.

Mode information determining section 601 receives, as input, mode information extracted from a common control signal, by control information extracting section 211.

As shown in FIG. 15, mode information determining section 601 stores a list indicating that reception is possible or impossible, based on associations between mode information at the time of multiuser MIMO and reception capability categories of terminal 600 (the number of spatial multiplexing able to be received by terminal 600). Mode information determining section 601 determines whether or not terminal 600 can receive spatially multiplexed signals transmitted from base station 100, based on the stored list and mode information at the time of multiuser MIMO obtained from control information extracting section 211. FIG. 15 shows an example of a list in which the interference cancellation capability of terminal 600 (the number of spatial multiplexing able to be received by terminal 600) is 3. Mode information determining section 601 outputs information indicating whether or not dedicated data sequences spatially multiplexed and transmitted can be received, to data extracting section 212.

That is, with the present embodiment, a case is assumed where not all the number of receiving systems is the same between all terminals MS #ms and where there is a terminal having a smaller number of reception systems than the number of spatial multiplexing at the time of multiuser MIMO.

Here, assume that it is possible to receive signals using linear weight by reception weight creating section 210 between terminals assigned to multiuser MIMO transmission.

Terminal 600 changes the operation to receive a dedicated data sequence (steps S9 and S10 in FIG. 7) based on output from mode information determining section 601. That is, when mode information determining section 601 determines that it is not possible to receive a dedicated data sequence, terminal 600 does not perform operations to receive a dedicated data sequence (step S9 and step S10 in FIG. 7), and, on the other hand, when mode information determining section 601 determines that it is possible to receive a dedicated data sequence, performs operations to receive a dedicated data sequence (step S9 and step S10 in FIG. 7).

As described above, according to the present embodiment, in addition to Embodiment 1, mode information at the time of multiuser MIMO linked to interference cancellation capability of a terminal (the number of spatial multiplexing able to be received by a terminal) is contained in a common control signal and reported to the terminal, so that it is possible to control whether or not the terminal can receive dedicated data signals.

By this means, a terminal does not receive spatially multiplexed dedicated control signals beyond the interference cancellation capability of the terminal, and therefore need not to perform unnecessary reception operations. As a result of this, a terminal can reduce its power consumption.

In addition, mode information at the time of multiuser MIMO is assigned to a plurality of terminals having a certain level of interference cancellation capability, according to the number of spatial multiplexing at the time of multiuser MIMO transmission, so that a terminal can cancel dedicated control signals directed to other terminals and ensure the reception quality of a dedicated control signal directed to the terminal.

Here, new overhead directly due to use of multicast ID information at the time of multiuser MIMO does not occur by assigning static mode information fixed in advance, as mode information at the time of multiuser MIMO.

Figure 16:
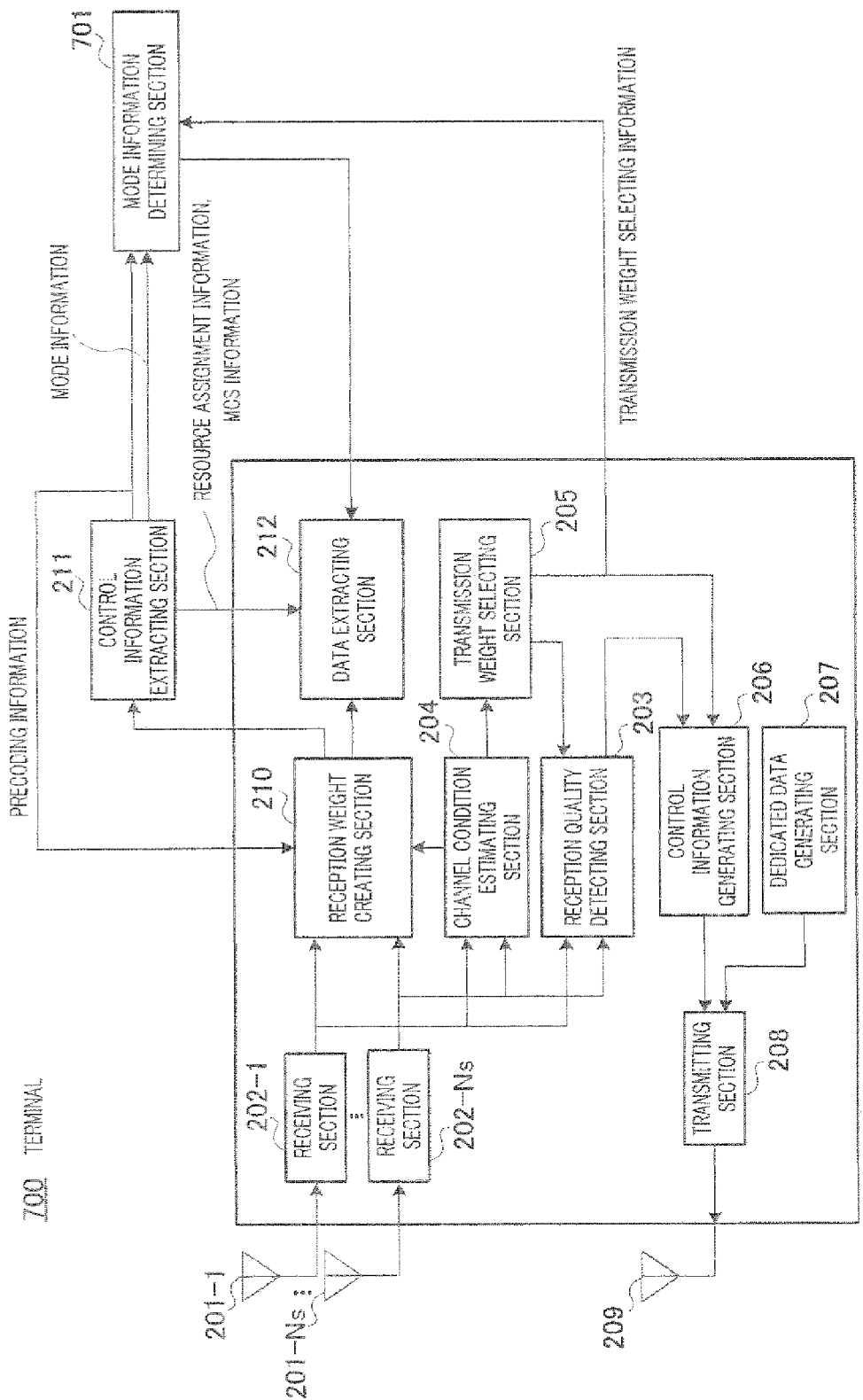
FIG. 16 is a block diagram showing a configuration example of a terminal apparatus according to Embodiment 3.

FIG. 16 shows another configuration of a terminal, where the same components as in FIG. 14 are assigned the same reference numerals. The configuration of mode information determining section 701 in terminal 700 differs from that of mode information determining section 601 in terminal 600 (FIG. 14). Mode information determining section 701 receives precoding information from control information extracting section 211, as input, and receives transmission weight information from transmission weight selecting section 205, as input.

Mode information determining section 701 stores transmission weight selecting information (transmission precoding beam) selected in transmission weight selecting section 205. In addition, as described above, mode information determining section 701 stores a list indicating that reception is possible or impossible, based on associations between mode information at the time of multiuser MIMO and reception capability categories of terminal 700 (the number of spatial multiplexing able to be received by terminal 700).

When precoding information extracted by control information extracting section 211 matches a transmission precoding beam selected by transmission weight selecting section 205 and mode information at the time of multiuser MIMO extracted by control information extracting section 211 indicates the number of spatial multiplexing that can be received by terminal 700, mode information determining section 701 determines that terminal 700 can receive dedicated data sequences spatially multiplexed and transmitted.

That is, terminal 700 does not receive spatially multiplexed dedicated control signals beyond the interference cancellation capability of terminal 700. In addition, when precoding information reported from base station 100 does not match the transmission precoding beam (transmission weight selecting information) selected by terminal 700, terminal 700 determines that there is no dedicated data signal directed to terminal 700, and receives no dedicated data signal. By this means, a terminal need not to perform unnecessary reception operations, and therefore reduce its power consumption accordingly.

Embodiment 4

With the present embodiment, while the configurations explained in the above-described Embodiments 1 to 3 are basic configurations, another configuration will be proposed where different common control signal and dedicated control signals from Embodiments 1 to 3 are formed and transmitted.

Figure 17:
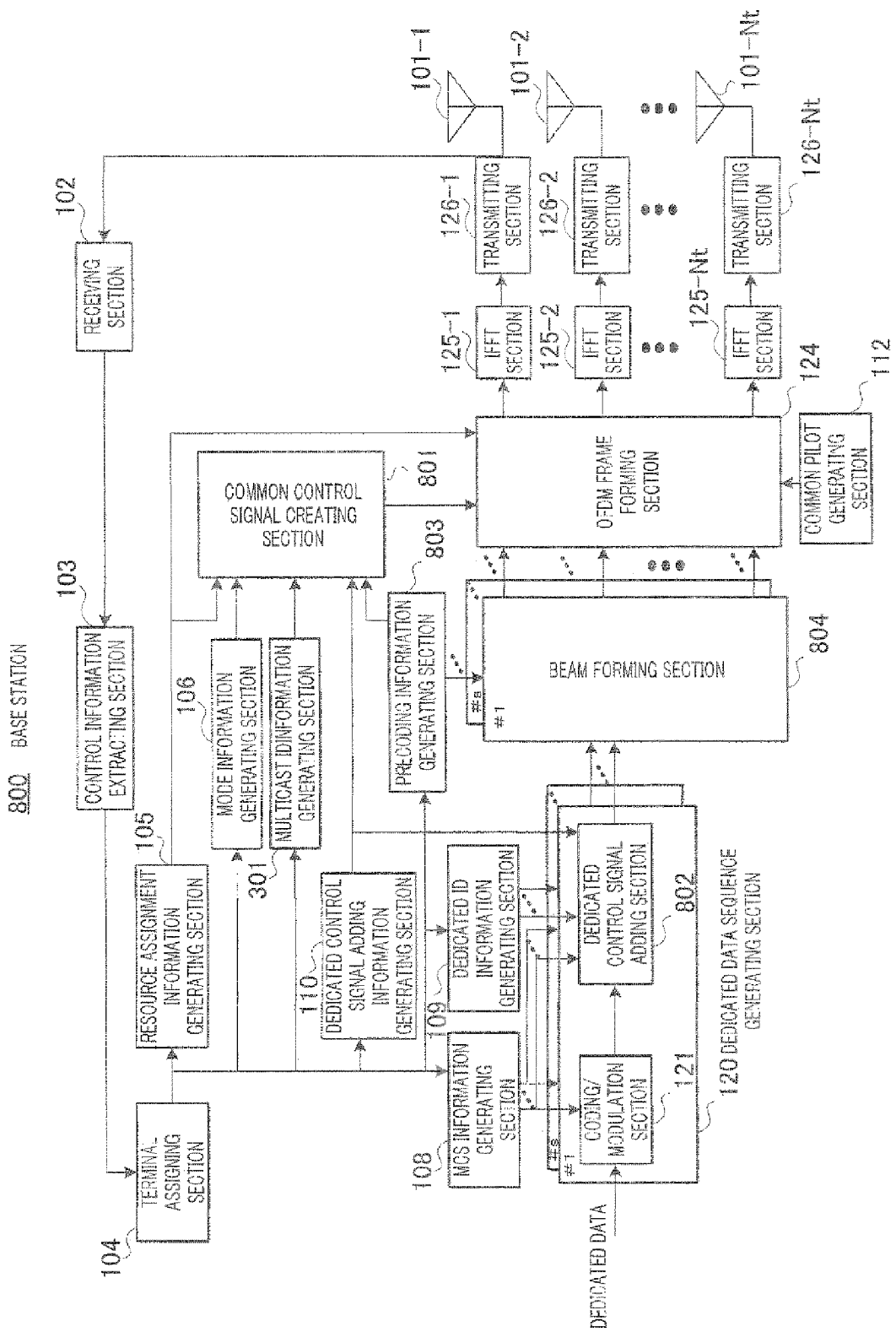
FIG. 17 is a block diagram showing a configuration of a base station apparatus according to Embodiment 4.

FIG. 17 shows a configuration of a base station according to the present embodiment, where the same components as in FIG. 8 are assigned the same reference numerals. Base station 800 differs from base station 300 (FIG. 8). described in Embodiment 2 in the configurations of common control signal forming section 801, dedicated control signal adding section 802, precoding information generating section 803 and beam forming section 804. Now these difference components will be explained.

Common control signal forming section 801 forms a common control signal from signals outputted from multicast ID information generating section 301, resource assignment information generating section 105, mode information generating section 106, dedicated control signal adding information generating section 110 and precoding information generating section 803, and outputs the common control signal to frame forming section 124.

Here, multicast ID information generating section 301 outputs multicast ID information (MID), based on the number of spatial multiplexing at the time of multiuser MIMO transmission contained in output from terminal assigning section 104. In addition, precoding information generating section 803 generates a piece of precoding information for one terminal at the time of multiuser MIMO, and, if a plurality of pieces of precoding information are generated for one terminal, precoding information to make the reception quality in the terminal best is reported (hereinafter, expressed as "precoding information A"). Accordingly, the number of precoding beams included in precoding information is equal to (a total number of spatial multiplexing)-(the number of terminals that perform multiplexing using multiuser MIMO).

When output from dedicated control signal adding information generating section 110 indicates that a dedicated control signal is to be added, dedicated control signal adding section 802 generates a dedicated control signal containing MCS information, dedicated ID information and precoding information, and adds this dedicated control signal to output from coding/modulation section 121. If not so, dedicated control signal adding section 802 outputs the output from coding/modulation section 121 as is.

Here, when dedicated control signal adding section 802 generates a dedicated control signal containing a plurality of pieces of precoding information for one terminal, the plurality of pieces of precoding information indicate precoding beams not reported by a common control signal (hereinafter expressed as "precoding information B").

Beam forming section 804 multiplies a dedicated control signal, among signals from dedicated control signal adding section 802, by a transmission vector matching precoding information A, and multiplies a dedicated data signal by transmission weight vectors matching precoding information A and precoding information B, according to output from precoding information generating section 803.

Figure 18:
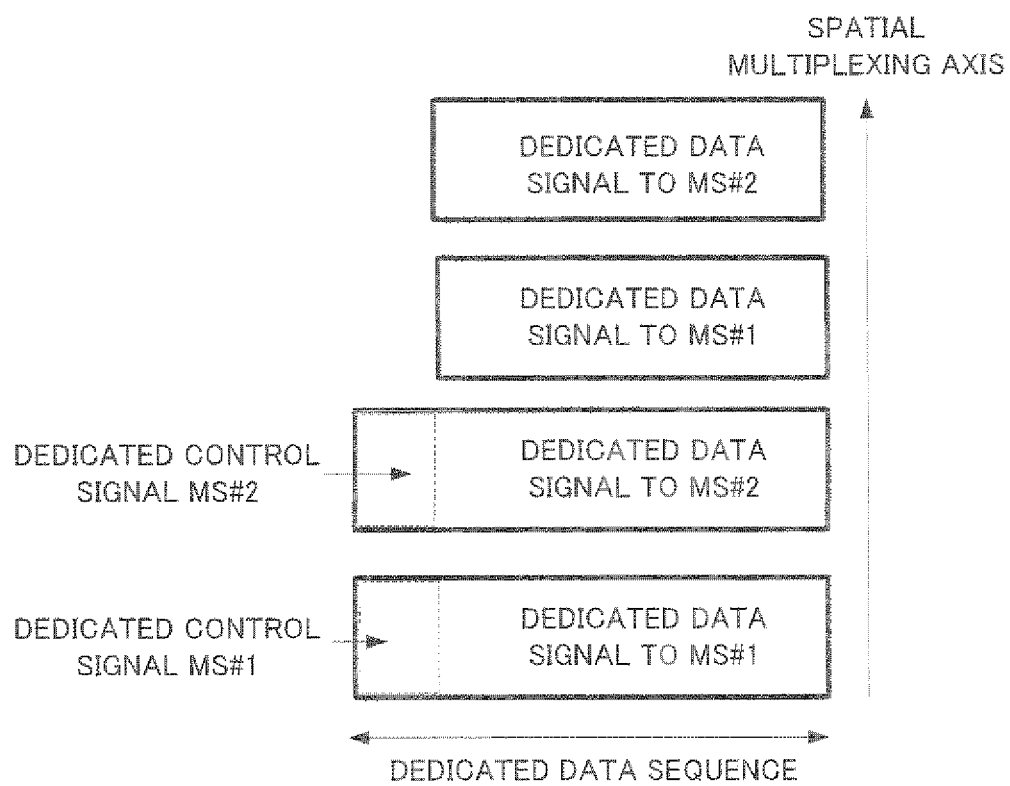
FIG. 18 shows a situation of dedicated control signals and dedicated data signals outputted from a beam forming section according to Embodiment 4.

FIG. 18 shows dedicated control signals and dedicated data signals outputted from beam forming section 804, where the number of spatial multiplexing for k-th terminal MS #k is Ns (k). Here, k=1, . . . , Nm. Here, in the figure, although a frame format of dedicated control signals and dedicated data signals is used as an example where Nm=2, Ns (k)=2, that is, the total number of spatial multiplexing is 4, this is by no limiting.

In FIG. 18, dedicated control signals are formed into beams and outputted to Nm terminals, based on respective pieces of precoding information. In addition, a dedicated data signal for k-th terminal MS #k is spatially multiplexed using a total of Ns (k) pieces of precoding information by adding (Ns (k)−1) pieces of transmission precoding beam information to precoding information contained in a dedicated control signal.

Although the configuration of terminal 800 may be approximately the same as that of terminal 400 (FIG. 10) explained in Embodiment 2, the configuration of control information extracting section 211 slightly varies. Now, the different component will be explained.

Upon receiving a common control signal, control information extracting section 211 extracts resource assignment information and mode information in a dedicated data signal, and precoding information A used in terminals connected at the same time when multiuser MIMO transmission is performed.

Meanwhile, when terminal 400 receives a dedicated control signal, reception weight creating section 210 demultiplexes dedicated control signals spatially multiplexed and transmitted using precoding information A. Control information extracting section 211 refers to dedicated control adding information contained in a common control signal, and, when a dedicated data sequence signal contains a dedicated control signal, extracts information contained in the dedicated control signal. That is, control information extracting section 211 extracts a dedicated control signal from signals outputted from reception weight creating section 210, demodulates the dedicated control signal, performs channel error correction on a modulated dedicated control signal and decodes the result to restore control information. By this means, MCS information, dedicated ID information and precoding information B contained in a dedicated control signal are extracted.

Next, when the dedicated ID information contained in the dedicated control signal is directed to terminal 400, terminal 400 performs dedicated data reception processing (step S10 in FIG. 7) as follows. Reception weight creating section 210 demultiplexes dedicated data sequence signals spatially multiplexed and transmitted directed to terminal 400, using precoding information A and precoding information B. Data extracting section 212 extracts a dedicated data signal whose dedicated ID information is directed to terminal 400, from signals outputted from reception weight creating section 210, demodulates the dedicated data signal based on MCS information contained in the dedicated control signal, performs channel error correction on a demodulated dedicated data signal and decodes the result to restore dedicated data.

As described above, according to the present embodiment, a dedicated control signal is spatially multiplexed into the same number of spatial multiplexing as the number of destination terminals, and dedicated data directed to each terminal is spatially multiplexed into the same number of spatial multiplexing as the number of transmission beams, so that it is possible to improve reception quality of a dedicated control signal that is important data when "a total number of spatial multiplexing>the number of terminals subject to multiplexing."

Embodiment 5

With the present embodiment, while the configurations explained in the above-described Embodiments 1 to 3 are basic configurations, another configuration will be suggested where, when the number of spatial multiplexing of a dedicated control signal is more than 2, dedicated control signal adding section 802 (FIG. 17) groups dedicated control signals and transmits these dedicated control signals using a transmission format in which different frequency resources or time resources are assigned between groups.

Figure 19:
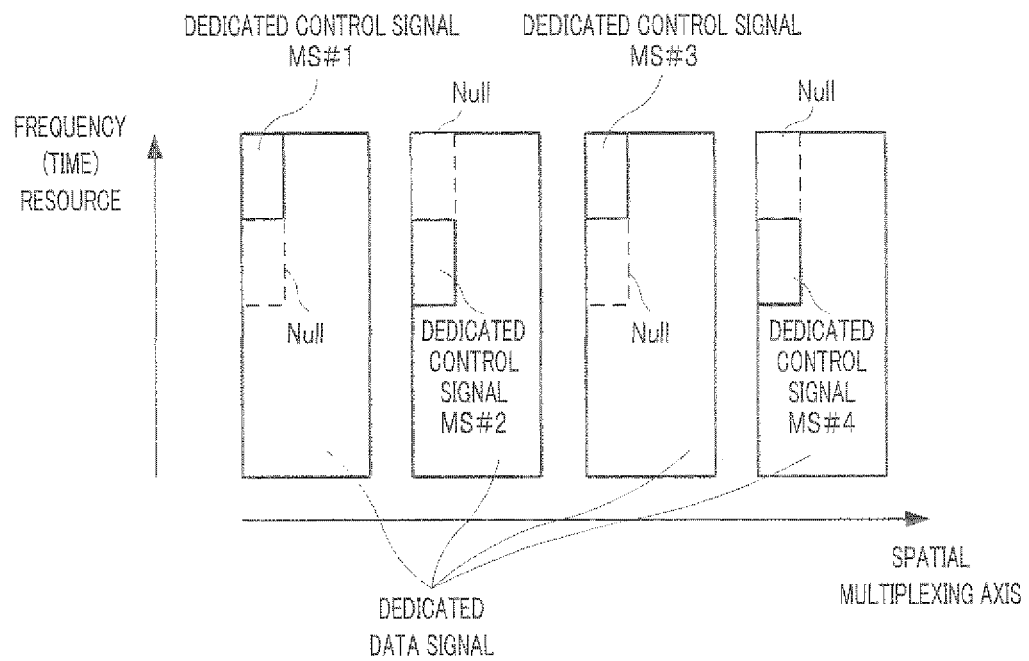
FIG. 19 shows a transmission format of dedicated control signals according to Embodiment 5.

FIG. 19 shows a transmission format of dedicated control signals when the number of spatial multiplexing of a dedicated data signal is 4 and these four spatially multiplexed dedicated data signals are transmitted to four terminals (one signal is transmitted to one terminal). In an example in the figure, dedicated control signals for terminal MS #1 and terminal MS #3 are grouped into one group, and dedicated control signals for terminal MS #2 and terminal MS #4 are grouped into one group. Then, dedicated control signals in one group are transmitted using common frequency (or time) resources, and dedicated control signals in different groups are transmitted using different frequency (or time) resources.

By using the above-described transmission format, it is possible to reduce the number of spatial multiplexing of a dedicated control signal than the number of spatial multiplexing of a dedicated data signal, by spatially multiplexing the dedicated control signal and transmitting the result using a plurality of frequency (or time) resources. By this means, in addition to an advantage that can reduce overhead due to report of dedicated ID information and MCS information, it is possible to decrease the number of spatial multiplexing of dedicated control signals, so that it is possible to produce an effect of improving reception quality of dedicated control information, which is important data.

Embodiment 6

With the present embodiment, while the configurations explained in the above-described Embodiment 1 to 3 are basic configurations, another configuration will be proposed where, when the number of spatial multiplexing of a dedicated control signals is greater than 2, dedicated control signal adding section 802 (FIG. 17) groups dedicated control signals and transmits grouped dedicated control signals using a transmission format in which space-time block coding: STBC or space-frequency block coding: SFBC are used on a per group basis.

Figure 20:
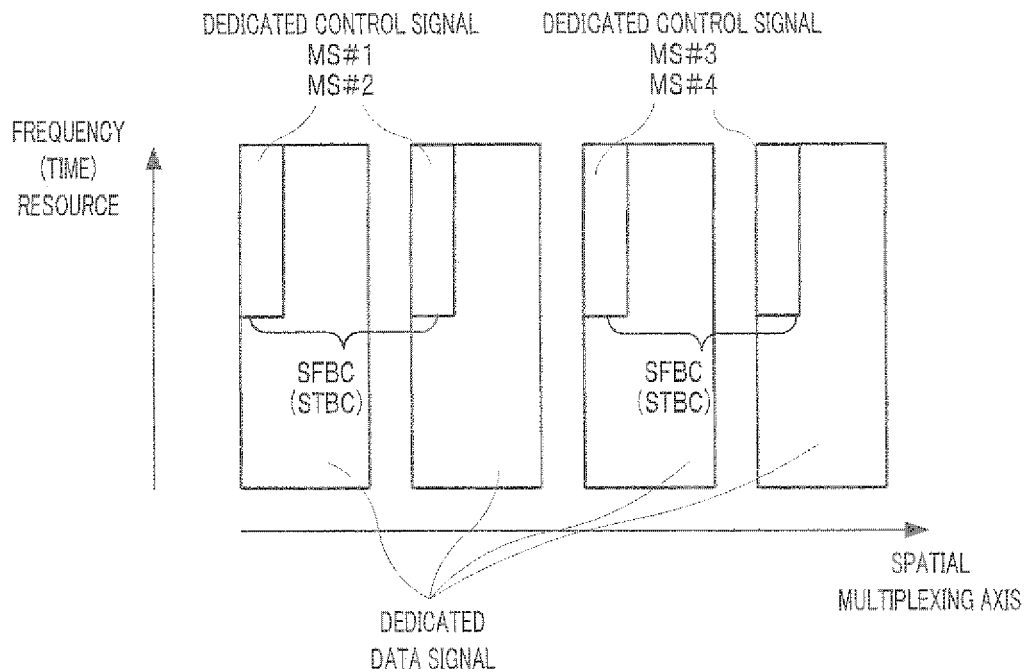
FIG. 20 shows a transmission format of dedicated control signals according to Embodiment 6.

FIG. 20 shows a transmission format of dedicated control signals when the number of spatial multiplexing of a dedicated data signal is 4 and these four spatially multiplexed dedicated data signals are transmitted to four terminals (one signal is transmitted to one terminal). In an example in the figure, dedicated control signals for terminal MS #1 and terminal MS #2 are grouped into one group, and dedicated control signals for terminal MS #3 and terminal MS #4 are grouped into one group. Then dedicated control signals in one group are transmitted using STBC or SFBC.

By using above-described transmission format, in addition to an advantage that can reduce overhead due to report of dedicated ID information and MCS information, it is possible to improve reception quality of dedicated ID information, which is important data, by time-space/time-frequency diversity effect.

Embodiment 7

With the present embodiment, while the configurations explained in the above-described Embodiments 1 to 3 are basic configurations, another configuration will be suggested where a different common control signal from common control signals in Embodiments 1 to 3.

With the present embodiment, when a dedicated data sequence is transmitted by varying multiuser MIMO transmissions a number of times, multiuser MIMO transmissions sharing in common mode information, multicast ID information and dedicated control signal adding information are grouped, so that control information shared in common is transmitted only once and a plurality of pieces of assignment information and their pieces of precoding information are collectively reported. This operation may be performed in, for example, common control signal forming section 801 in FIG. 17.

Figure 21:
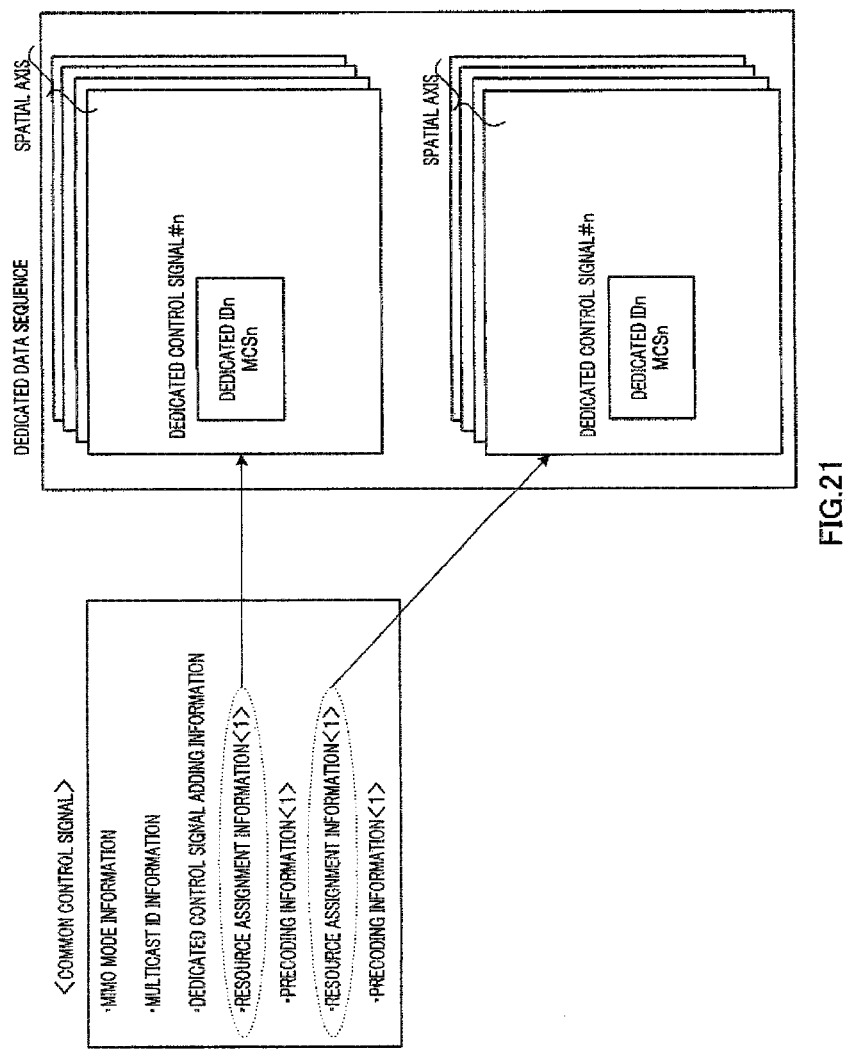
FIG. 21 explains a common control signal according to Embodiment 7.

FIG. 21 shows an example of a format of a common control signal according to the present embodiment. In the figure, when a dedicated data sequence is transmitted by varying multiuser MIMO transmissions a number of times (twice in the figure, but this is by no limiting), a format is shown where each common control signal shares in common mode information, multicast ID information and dedicated control signal adding information. With the format shown in the figure, common information is designated only once without duplication, a common control signal contains different resource information between a plurality of different multiuser MIMO transmissions and precoding information associated with this resource information.

By using the above described format of common control signals, when a dedicated data sequence contains data transmitted by a plurality of different multiuser MIMO transmissions, information shared to use can be compressed, so that it is possible to reduce overhead at the time of data transmission.

Another Embodiment

[1] Here, with the above-described embodiment, taking into account significant effect of reducing overhead is produced particularly when the number of spatial multiplexing is three or more, formats of common control signals and dedicated control signals may be changed, according to the number of spatial multiplexing at the time of multiuser MIMO. In this case, it is preferable that operations of a common control signal forming section are changed as follows.

1) When the number of spatial multiplexing is three or more: operations described in any of Embodiment 1 to 3 are performed.

2) When the number of spatial multiplexing is equal to or smaller than two: resource assignment information, mode information, dedicated control signal adding information (indicating that no dedicated control signal is added), all pieces of dedicated ID information to perform spatial multiplexing using multiuser MIMO transmission, and MCS information and precoding information in dedicated data signals associated with these pieces of dedicated ID information are contained in a common control signal (hereinafter referred to as "dedicated ID listing method").

Whether to perform processing of 1) or processing of 2) is determined, based on if dedicated control signal adding section 122 adds a dedicated control signal or not. As described above, dedicated control signal adding section 122 controls whether or not to add a dedicated control signal, based on dedicated control signal adding information (indicating that no dedicated control signal is added). In order to realize processing of 1) and processing of 2), dedicated control signal adding section 122 adds a dedicated control signal when the number of spatial multiplexing is three or more, and adds no dedicated control signal when the number of spatial multiplexing is equal to or smaller than two. Here, when the number of spatial multiplexing is equal to or less than two, dedicated control information may be inputted to common control signal forming section 111.

[2] Here, moreover, if a transmission format of common control signals using the dedicated ID listing method, when all pieces of dedicated ID information to perform spatial multiplexing by multiuser MIMO transmission, and MCS information and precoding information in dedicated data signals associated with these pieces of dedicated ID information are contained in a common control signal, it is possible to produce an additional effect of reducing overhead by applying a technique for reducing the amount of information as follows.

FIG. 22 shows a transmission format of a common control signal. In the figure, PMI refers to "precoding matrix index", and PVI refers to "precoding vector index", and these PMI and PVI are transmitted as precoding information.

Here, when transmission precoding beams orthogonal to one another are shared between a base station and a terminal, as precoding information (codebooks), it is possible to hierarchically designate precoding beams using PMI and PVI.

Now, this is explained, where PMT represents an index of a plurality of orthogonal (or unitary) matrixes, and PVI represents index of their row (or column) vectors. In this case, in order to keep orthogonality between beams at the time of multiuser MIMO transmission, one orthogonal (or unitary) matrix is designated and its column (row) vector is designated, that is, PMI is shared and used between a plurality of beams, and PVI is designated according to the number of beams.

Therefore, as shown in FIG. 22, PMI is shared in common between a plurality of beams, so that one PMI is contained in order to reduce the amount of information, and PVI is designated as information about orthogonal beam weights used for each terminal. By this means, it is possible to transmit information about PMI without overlap to allow reduction of overhead. Here, when a plurality of precoding information PVIs are used for a terminal, PVIs are listed for one piece of dedicated ID information. By this means, it is possible to transmit dedicate ID information without overlap to allow reduction of overhead.

Figures 22A, 22B:
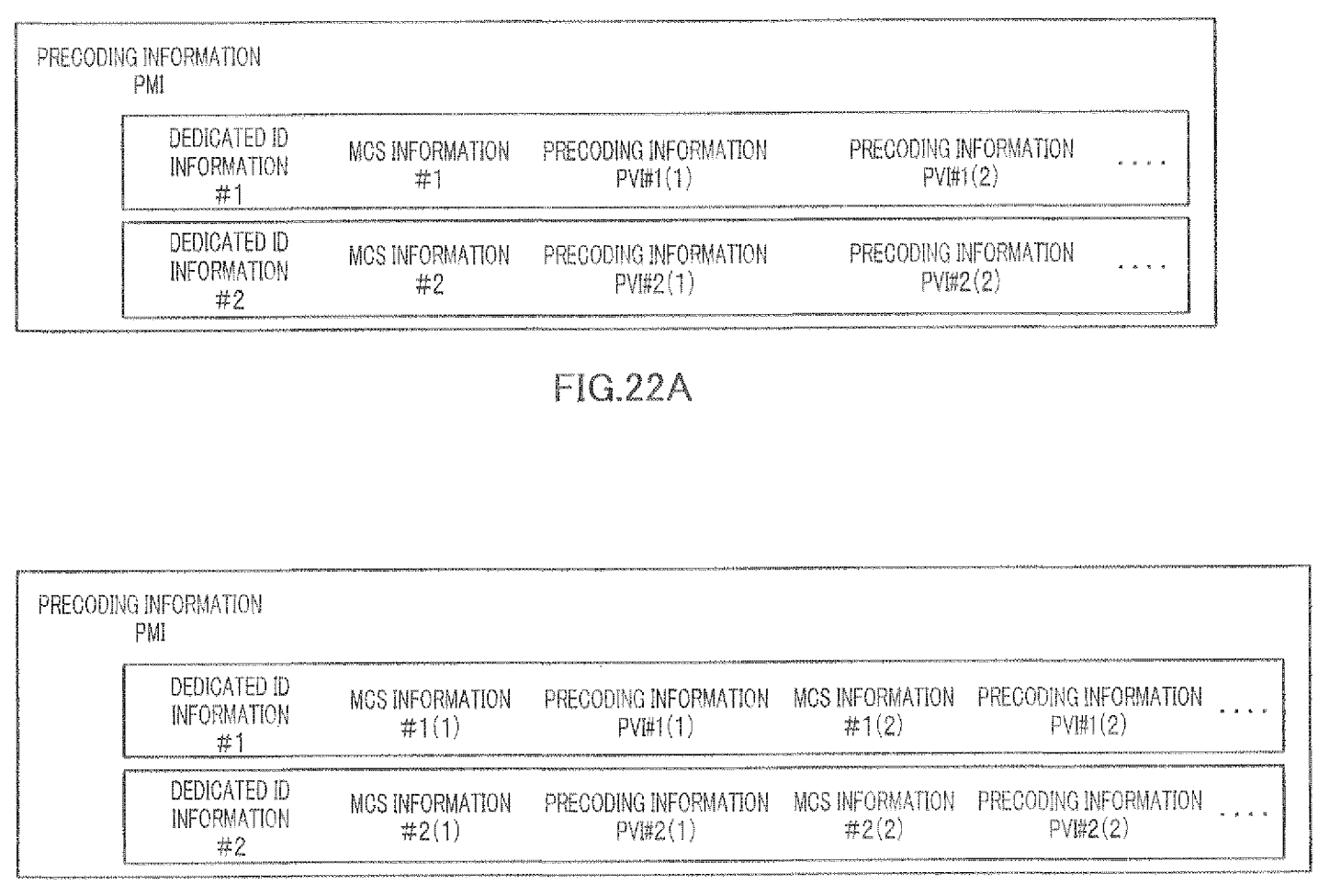

In addition, when MCS information is shared in common between streams, precoding information PVI #1, #2, . . . are listed for one piece of MCS information (FIG. 22A). When MCS information varies between streams, MCS information and precoding information PVIs are listed in pairs. (FIG. 22B). By this means, it is possible to transmit MCS information without duplication to allow reduction of overhead.

[3] With the above-described embodiments, although a case has been explained where user assignment information is reported using a common control signal and dedicated control signals at the time of multiuser MIMO transmission in the downlink from a base station to terminals, the present invention is also applicable to a case in which user assignment information is reported at the time of multiuser MIMO transmission in the uplink from terminals to a base station. In this case, a common control signal is reported as broadcast information in the downlink. Dedicated control signals are contained in dedicated data sequences in the uplink and transmitted. By this means, it is possible to produce the same effect as in the above-described embodiments.

[4] Here, the present invention can be practiced by appropriately replacing terms used in the above-described embodiments with other terms. For example, if a pilot signal is replaced with "reference signal," a table is replaced with "codebook," the number of spatial multiplexing is replaced with "the number of streams," dedicated ID information is replaced with "connection ID," and a dedicated data sequence is replaced with "DL burst," it is possible to practice the present invention like the above-described embodiments.

The disclosure of Japanese Patent Application No. 2008-208047, filed on Aug. 12, 2008, including the specification, drawings and abstract, is incorporated herein by reference in its entirety.

INDUSTRIAL APPLICABILITY

The present invention is widely applicable to a base station apparatus and a terminal apparatus that perform multiuser MIMO transmission.

The invention claimed is:

1. A terminal apparatus that can demodulate signals transmitted by multiuser multiple-input multiple-output, the terminal apparatus comprising:
  a channel estimating section;
  a reception weight creating section; and
  a control information extracting section, wherein:
    when a common control signal is received, the reception weight creating section obtains the common control signal using reception weight based on a channel matrix estimated by the channel estimating section, and the control information extracting section extracts resource assignment information and precoding information contained in the common control signal;
    when spatially multiplexed signals are received, the reception weight creating section obtains dedicated data and a dedicated control signal using the reception weight based on the precoding information, and the control information extracting section extracts dedicated identifier information and modulation and coding scheme information contained in the dedicated control signal;
    the common control signal contains information indicating the number of spatial multiplexing of transmitted signals; and
    whether or not to demodulate spatial multiplexing signals is controlled by comparing between the number of spatial multiplexing and interference cancellation capability of the terminal apparatus.

2. A terminal apparatus that can demodulate signals transmitted by multiuser multiple-input multiple-output, the terminal apparatus comprising:
  a channel estimating section;
  a reception weight creating section; and
  a control information extracting section, wherein:
    when a common control signal is received, the reception weight creating section obtains the common control signal using reception weight based on a channel matrix estimated by the channel estimating section, and the control information extracting section extracts resource assignment information and precoding information contained in the common control signal;
    when spatially multiplexed signals are received, the reception weight creating section obtains dedicated data and a dedicated control signal using the reception weight based on the precoding information, and the control information extracting section extracts dedicated identifier information and modulation and coding scheme information contained in the dedicated control signal;

the precoding information extracted by the control information extracting section and precoding information requested by the terminal apparatus are compared; and only when these pieces of precoding information match, the dedicated control signal is demodulated.

3. A transmitting method that performs multiuser multiple-input multiple-output transmission, the transmitting method comprising the steps of:

forming spatial multiplexing signals transmitted from a plurality of antennas;

forming a common control signal transmitted in common from the plurality of antennas; and adding dedicated control signals directed to respective terminals to the spatial multiplexing signals; and generating information indicating a number of spatial multiplexing of a transmission signal, wherein the common control signal forming step forms the common control signal containing the spatial multiplexing information, and the generating step generates multicast identifier information as information indicating the number of spatial multiplexing.

4. A transmitting method that performs multiuser multiple-input multiple-output transmission, the transmitting method comprising the steps of:

forming spatial multiplexing signals transmitted from a plurality of antennas;

forming a common control signal transmitted in common from the plurality of antennas; and adding dedicated control signals directed to respective terminals to the spatial multiplexing signals; and generating information indicating a number of spatial multiplexing of a transmission signal, wherein the common control signal forming step forms the common control signal containing the spatial multiplexing information, and the generating step generates mode information at a time of multiuser multiple-input multiple-output transmission, as information indicating the number of spatial multiplexing.

5. A base station apparatus that performs multiuser multiple-input multiple-output transmission, comprising:

a spatial multiplexing signal forming section that forms spatial multiplexing signals transmitted from a plurality of antennas;

a common control signal forming section that forms a common control signal shared between the plurality of antennas and transmitted from the plurality of antennas;

a dedicated control signal adding section that adds dedicated control signals directed to respective terminals, into the spatial multiplexing signals; and a spatial multiplexing information generating section that generates information indicating a number of spatial multiplexing of a transmission signal, wherein the common control signal forming section forms the common control signal containing the spatial multiplexing information, and the spatial multiplexing information generating section generates multicast identifier information as information indicating the number of spatial multiplexing.

6. The base station apparatus according to claim 5, wherein the spatial multiplexing signal forming section generates a spatial multiplexing signal that is transmitted by the same number of spatial multiplexing as the number of terminals to which the dedicated control signals are transmitted, and that is spatial multiplexed by the same number of spatial multiplexing as the number of beams used to transmit dedicated data directed to each terminal.

7. The base station apparatus according to claim 5, wherein the dedicated control signals are grouped and assigned to different frequency resources or time resources between groups.

8. The base station apparatus according to claim 5, wherein the dedicated control signals are grouped, and subject to space-time block coding processing or space-frequency block coding on a per group basis.

9. The base station apparatus according to claim 5, wherein signals indicating common dedicated control information, among the dedicated control signals, are formed into the common control signal, by the common control signal forming section.

10. The base station apparatus according to claim 5 wherein whether to contain the dedicated control signals in the spatial multiplexing signals or the common control signal is controlled, based on the number of spatial multiplexing.

11. The base station apparatus according to claim 5,
wherein: the common control signal contains resource assignment information and precoding information; and
a dedicated control signal contains dedicated identifier information and modulation and coding scheme information.

12. The base station apparatus according to claim 5,
wherein: the common control signal contains precoding matrix index and precoding vector index as precoding information; and
the common control signal forming section forms the common control signal in which the precoding matrix index and the precoding vector index are layered.

13. A base station apparatus that performs multiuser multiple-input multiple-output transmission, comprising:

a spatial multiplexing signal forming section that forms spatial multiplexing signals transmitted from a plurality of antennas;

a common control signal forming section that forms a common control signal shared between the plurality of antennas and transmitted from the plurality of antennas;

a dedicated control signal adding section that adds dedicated control signals directed to respective terminals, into the spatial multiplexing signals; and a spatial multiplexing information generating section that generates information indicating a number of spatial multiplexing of a transmission signal, wherein the common control signal forming section forms the common control signal containing the spatial multiplexing information, and the spatial multiplexing information generating section generates mode information at a time of multiuser multiple-input multiple-output transmission, as information indicating the number of spatial multiplexing.

14. The base station apparatus according to claim 13, wherein the spatial multiplexing signal forming section generates a spatial multiplexing signal that is transmitted by the same number of spatial multiplexing as the number of terminals to which the dedicated control signals are transmitted, and that is spatial multiplexed by the same number of spatial multiplexing as the number of beams used to transmit dedicated data directed to each terminal.

15. The base station apparatus according to claim 13, wherein the dedicated control signals are grouped and assigned to different frequency resources or time resources between groups.

16. The base station apparatus according to claim 13, wherein the dedicated control signals are grouped, and subject to space-time block coding processing or space-frequency block coding on a per group basis.

17. The base station apparatus according to claim 13, wherein signals indicating common dedicated control information, among the dedicated control signals, are formed into the common control signal, by the common control signal forming section.

18. The base station apparatus according to claim 13 wherein whether to contain the dedicated control signals in the spatial multiplexing signals or the common control signal is controlled, based on the number of spatial multiplexing.

19. The base station apparatus according to claim 13,
wherein: the common control signal contains resource assignment information and precoding information; and
a dedicated control signal contains dedicated identifier information and modulation and coding scheme information.

20. The base station apparatus according to claim 13,
wherein: the common control signal contains precoding matrix index and precoding vector index as precoding information; and
the common control signal forming section forms the common control signal in which the precoding matrix index and the precoding vector index are layered.

* * * * *